United States Patent
Stalker et al.

(10) Patent No.: US 11,159,602 B2
(45) Date of Patent: Oct. 26, 2021

(54) UPDATING ELECTRICAL DEVICES WITH LIMITED COMMUNICATION CAPABILITY IN INTEGRATED NETWORKS

(71) Applicant: SIGNIFY HOLDING B.V., Eindhoven (NL)

(72) Inventors: Altan John Stalker, Lawrenceville, GA (US); Russell Leake, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/728,782

(22) Filed: Dec. 27, 2019

(65) Prior Publication Data

US 2021/0203712 A1    Jul. 1, 2021

(51) Int. Cl.
| | | |
|---|---|---|
| *H04L 29/08* | (2006.01) | |
| *H04L 12/46* | (2006.01) | |
| *G06F 16/182* | (2019.01) | |
| *H04L 12/18* | (2006.01) | |
| *H04W 4/80* | (2018.01) | |

(52) U.S. Cl.
CPC ............ *H04L 67/06* (2013.01); *G06F 16/182* (2019.01); *H04L 12/18* (2013.01); *H04L 12/46* (2013.01); *H04L 67/12* (2013.01); *H04W 4/80* (2018.02)

(58) Field of Classification Search
CPC ....................................................... H04L 67/06
See application file for complete search history.

(56) References Cited

U.S. PATENT DOCUMENTS

| | | | |
|---|---|---|---|
| 6,775,298 B1 * | 8/2004 | Aggarwal | H04L 67/06 370/219 |
| 7,069,572 B2 | 6/2006 | Stalker | |
| 7,467,235 B2 * | 12/2008 | Kameda | G06F 3/0619 709/212 |
| 2003/0093467 A1 * | 5/2003 | Anderson | H04L 29/06 709/203 |
| 2003/0182373 A1 * | 9/2003 | Soto | H04L 29/06 709/204 |
| 2008/0310414 A1 * | 12/2008 | Yonge, III | H04L 45/123 370/390 |
| 2013/0339734 A1 | 12/2013 | Vernia et al. | |
| 2015/0304843 A1 * | 10/2015 | Hillyard | G06F 21/44 726/5 |
| 2017/0024409 A1 * | 1/2017 | Shekhar | H04L 67/1097 |
| 2018/0285088 A1 * | 10/2018 | Lancioni | G06F 8/658 |
| 2020/0389511 A1 * | 12/2020 | Dwivedi | H04L 65/102 |

\* cited by examiner

*Primary Examiner* — Brian Whipple

(57) ABSTRACT

A system for providing data to electrical devices in an interconnected network can include a user system disposed in a volume of space, where the user system has a communication range, where the user system broadcasts multiple communication signals into the volume of space. The system can also include an electrical device disposed within the communication range of the user system, where the electrical device includes a controller, where the controller can retrieve first information from a first communication signal, where the information includes a file identification for a file and a number of blocks in the file. The controller can also generate a table for the number of blocks in the file and retrieve second information from a second communication signal, where the second information comprises a first block of the file. The controller can also store the first block of the file in the table.

14 Claims, 18 Drawing Sheets

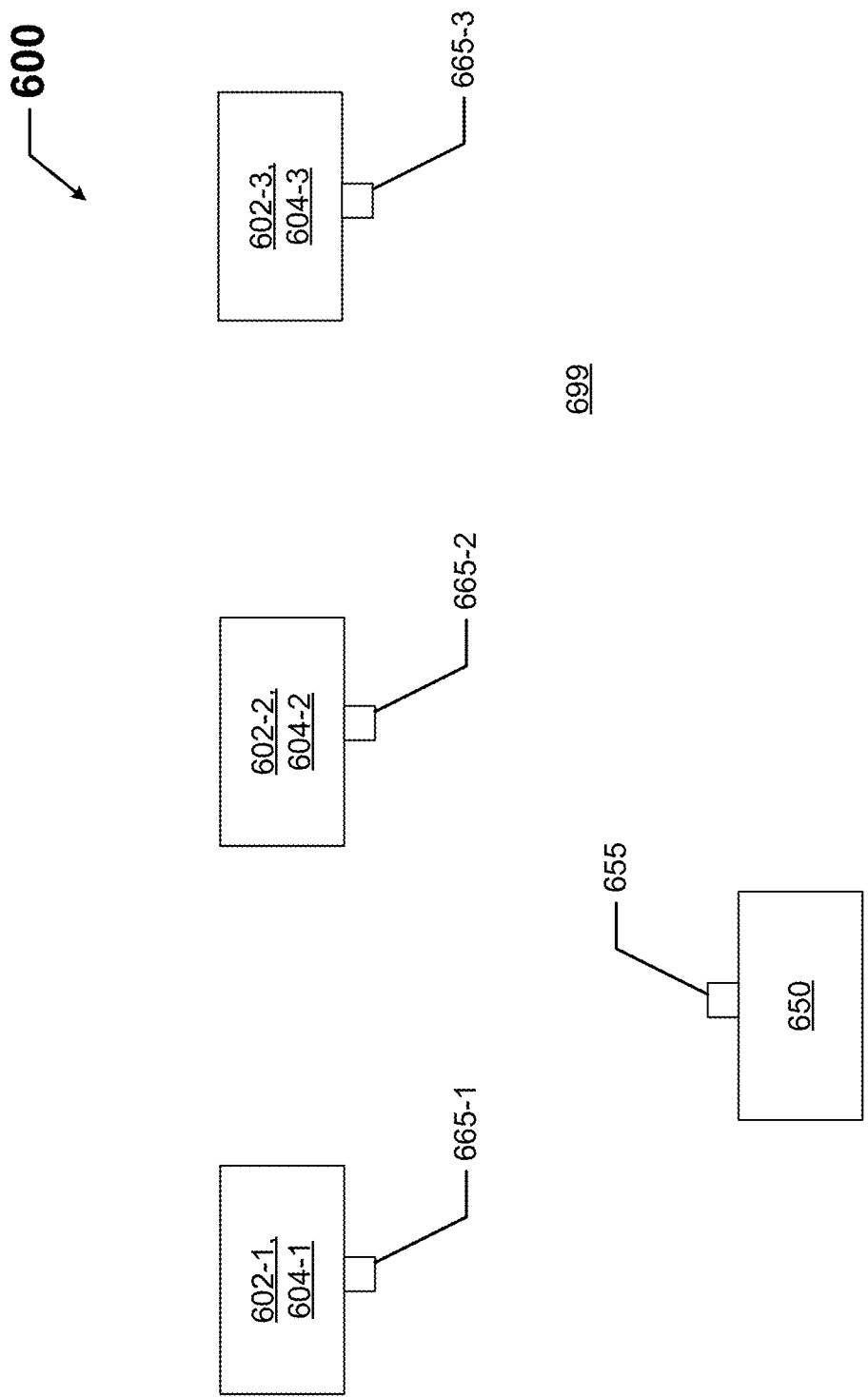

US 11,159,602 B2

UPDATING ELECTRICAL DEVICES WITH LIMITED COMMUNICATION CAPABILITY IN INTEGRATED NETWORKS

TECHNICAL FIELD

Embodiments described herein relate generally to integrated networks, and more particularly to systems, methods, and devices for updating electrical devices with limited communication capability in integrated networks.

BACKGROUND

Integrated networks include multiple devices that communicate, directly or indirectly, with one another. At times, some of these electrical devices, particularly at the bottom of the communication hierarchy, can have limited communication capabilities.

SUMMARY

In general, in one aspect, the disclosure relates to a system for providing data to electrical devices in an interconnected network. The system can include a user system disposed in a volume of space, where the user system has a communication range, where the user system broadcasts, using a first communication protocol, a plurality of communication signals into the volume of space. The system can also include a first electrical device disposed in the volume of space and within the communication range of the user system, where the first electrical device includes a first receiver and a first controller coupled to the first receiver, where the first receiver receives the plurality of communication signals broadcast by the user system. The first controller can retrieve first information from a first communication signal, received by the first receiver, of the plurality of communication signals, where the first information includes a first file identification for a first file and a first number of blocks in the first file. The first controller can also generate a first table for the first number of blocks in the first file. The first controller can further retrieve second information from a second communication signal, received by the first receiver, of the plurality of communication signals, where the second information includes a first block of the first file. The first controller can also store the first block of the first file in the first table.

In another aspect, the disclosure can generally relate to a user system that includes a memory having a first plurality of instructions. The user system can also include an app that executes the first plurality of instructions to receive, using a first communication protocol, a master file from a network manager, where the master file includes a second plurality of instructions for at least one recipient electrical device. The app can also execute the first plurality of instructions to reorganize the master file into one or more blocks. The app can further execute the first plurality of instructions to generate a summary file that includes a number of blocks and an identification of the at least one recipient electrical device. The app can also execute the first plurality of instructions to broadcast, using a second communication protocol, a plurality of communication signals that includes the summary file and the one or more blocks.

These and other aspects, objects, features, and embodiments will be apparent from the following description and the appended claims.

BRIEF DESCRIPTION OF THE DRAWINGS

The drawings illustrate only example embodiments of updating electrical devices with limited communication capability in integrated networks and are therefore not to be considered limiting of its scope, as updating electrical devices with limited communication capability in integrated networks may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

FIGS. 6A and 6B show a side and top view, respectively, of a system that includes a user system and a number of electrical devices located in a volume of space in accordance with certain example embodiments.

DETAILED DESCRIPTION OF EXAMPLE EMBODIMENTS

Figure 1:
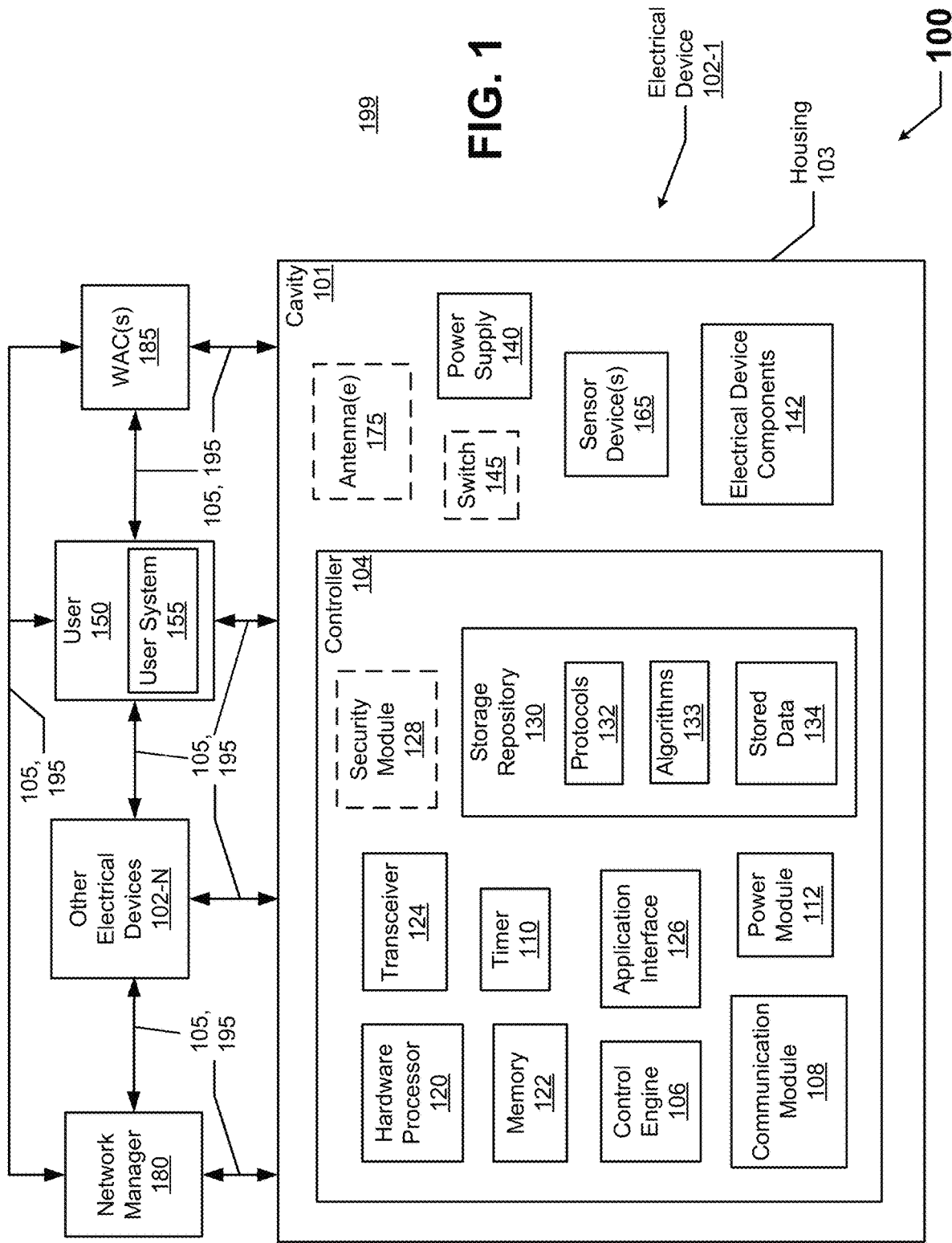
FIG. 1 shows a diagram of a system in accordance with certain example embodiments.

The example embodiments discussed herein are directed to systems, methods, and devices for updating electrical devices with limited communication capability in integrated networks. While example embodiments are described herein as updating electrical devices in the form of light fixtures and/or integrated sensor devices, example embodiments can update one or more of a number of other types of electrical devices in addition to, or as an alternative to, light fixtures and/or integrated sensor devices. Such other electrical devices can include, but are not limited to, a light switch, a control panel, a thermostat, an electrical wall outlet, a smoke detector, a $CO_2$ monitor, a motion detector, a broken glass sensor, and a camera.

Example embodiments can be used for a volume of space having any size and/or located in any environment (e.g., indoor, outdoor, hazardous, non-hazardous, high humidity, low temperature, corrosive, sterile, high vibration). Further, while communication signals described herein are radio frequency (RF) signals, example embodiments can be used with any of a number of other types of communication signals using any type of communication platform, including but not limited to visible light signals, LiFi, WiFi, Bluetooth, Bluetooth Low Energy (BLE), RFID, ultraviolet waves, microwaves, and infrared signals. For example, RF signals transmitted using BLE are sent and received at approximately 2.4 GHz.

When an electrical device in an example system is a light fixture (also called a luminaire), the light fixture can be any of a number of types of light fixtures, including but not limited to a troffer, a pendant light fixture, a floodlight, a spotlight, an emergency egress fixture, an exit sign, a down can light fixture, and a high bay light fixture. Regardless of the type of light fixture, such a light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

Example embodiments provide efficient and effective ways to provide software updates to electrical devices in an integrated network. In addition, example embodiments can provide a high level of data security if such security is desired by a user. Example embodiments can be installed with new electrical (e.g., lighting, security, entertainment, HVAC) systems, including electrical devices thereof. Alternatively, example embodiments can be programmed into existing electrical systems and related equipment with little to no need to add or modify existing hardware.

In certain example embodiments, integrated systems, including electrical devices that are updated using example embodiments, can be subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of updating electrical devices with limited communication capability in integrated networks will be described more fully hereinafter with reference to the accompanying drawings, in which example embodiments of updating electrical devices with limited communication capability in integrated networks are shown. Updating electrical devices with limited communication capability in integrated networks may, however, be embodied in many different forms and should not be construed as limited to the example embodiments set forth herein. Rather, these example embodiments are provided so that this disclosure will be thorough and complete, and will fully convey the scope of updating electrical devices with limited communication capability in integrated networks to those or ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and such terms are not meant to limit embodiments of updating electrical devices with limited communication capability in integrated networks. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 in a volume of space 199 in accordance with certain example embodiments. Specifically, the system 100 can include electrical device 102-1, one or more other electrical devices 102-N, one or more users 150, a network manager 180, and one or more wireless access controllers 185 (WACs 185). Electrical device 102-1 and the other electrical devices 102-N can collectively be referred to as electrical devices 102. Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in an example electrical device 102. Any component of the example electrical device 102-1 can be discrete or combined with one or more other components of the electrical device 102-1. For example, each electrical device 102 in the system 100 can have its own controller 104. Alternatively, one controller 104 can be used to control multiple electrical devices 102 in the system. As another example, a transceiver 124 of an electrical device 102 can be only a receiver or have limited transmission capability. An electrical device 102 is any device that uses electricity, at least in part, to operate. A list of some potential electrical devices 102 is described above.

A user 150 may be any person that interacts with one or more of the electrical devices 102 in the volume of space

199. Specifically, a user 150 may program, operate, and/or interface with one or more components (e.g., a controller 104, a WAC 185, the network manager 180) associated with the system 100 using example embodiments. Examples of a user 150 can include, but are not limited to, an employee, an engineer, an electrician, a technician, an operator, a visitor, a supervisor, a consultant, a contractor, an asset, the network manager 180, and a manufacturer's representative.

A user 150 can include a user system 155 (also sometimes called a user device 155), which may include a display (e.g., a GUI). Examples of a user system 155 can include, but are not limited to, a smart phone, an electronic tablet, a laptop computer, and a task-specific handheld device. An example of a user system is shown below with respect to FIG. 11. A user 150 (including an associated user system 155) can interact with (e.g., send data to, receive data from) the controller 104 of an electrical device 102 via the application interface 126 (described below). A user 150 (including an associated user system 155) can also interact with the network manager 180, one or more WACs 185, and/or the sensor devices 165. Interaction (including transmission of communication signals 195) between a user 150 (including an associated user system 155) and the electrical devices 102, the network manager 180, the WACs 185, and the sensor devices 165 can be facilitated using communication links 105.

In certain example embodiments, a user system 155 has an application (also referred to as an "app" herein) loaded thereon. Such an app (examples of which are shown as app 353 in FIG. 3 and app 1153 in FIG. 11 below) can implement one or more of a number of functions that are used to send software and/or firmware files (or, more generally, any type of file having any content) to one or more electrical devices 102. For example, an app of a user system 155 can receive a file or set of files from the network manager 180 and/or a WAC 185. Such file or set of files can be new or updated software and/or firmware updates for one or more of the electrical devices 102.

Upon receiving such file or set of files, the app of the user system 155 can determine whether the file or set of files can be sent in a single communication signal 195 to the one or more intended electrical devices 102. This determination can depend on one or more of a number of factors, including but not limited to the communication technology/protocol capability (e.g., BLE) of each of the intended electrical devices 102, the maximum size that such communication technology/protocol facilitates in a single communication signal 195, and the available bandwidth. If the app of the user system 155 determines that the file or set of files can be sent in one communication signal 195 to an electrical device 102, the app will use the capabilities (e.g., control engine, transceiver, communication module, storage repository) to do so. The communication protocol (e.g., Zigbee) used for the user system 155 to receive the file or set of files from the network manager 180 and/or a WAC 185 can be different than the communication protocol (e.g., BLE) used for the user system 155 to send the communication signals 195 to the electrical devices 102.

On the other hand, if the app of the user system 155 determines that the file or set of files must be sent in multiple communication signals 195 because the size is too large to be accommodated by a single communication signal 195, then the app of the user system 155 can organize the file or set of files into multiple blocks, where each block has a size (e.g., number of bytes) that can be sent by the app and received by an electrical device 102 using the available communication technology/protocol.

Regardless of whether the app of a user system 155 creates blocks from the file or set of files, each file generated by the app of a user system 155 for transmission to an electrical device 102 can include additional information aside from the data contained in the file or set of files received by the app of the user system 155. Such additional information can include, but is not limited to, an address (e.g., UUID) of the recipient electrical device 102, the ID of the user system 155, a file or module number, and a block number (if the app of the user system 155 generates multiple blocks from the file or set of files).

In certain optional example embodiments, as a security measure, the app of a user system 155 can additionally generate and send a separate indication message in a communication signal 195 to one or more of the electrical devices 102. Such an indication message can include, for example, a file number of the file or set of files that is being separately transmitted by the app of the user system 155, the file size (e.g., in bytes) of each file or set of files being separately transmitted by the app of the user system 155, the number of blocks for a particular file that is being separately transmitted by the app of the user system 155, the version of the file or set of files being separately transmitted by the app of the user system 155, the ID of the user system 155, the amount of time that it will take to send all blocks of a particular file, and an action that the electrical device 102 is to perform when the electrical device 102 receives all of the modules for a particular file.

In certain example embodiments, some or all of the functions listed above with respect to the app of a user system 155 can be performed by the controller of that user system 155. In addition, or in the alternative, some or all of the functions listed above with respect to the app of a user system 155 can be performed by the controller of that network manager 180 and/or a WAC 185.

Once the file or set of files have been processed, as discussed above, then the app of the user system 155 broadcasts multiple communication signals 195 for receipt by one or more of the electrical devices 102 within communication range of the user system 155 in the volume of space 199. Even if there is only a single file in a single communication signal 195, that communication signal 195 is broadcast by the user system 155 multiple times in case a particular broadcast of a communication signal 195 is not received by an electrical device 102. Such a situation can arise, for example, if the bandwidth of the communication channel (e.g., using BLE) is overloaded when one of the communication signals 195 is broadcast, if there is some type of interference with the communication network at a point in time that coincides with the broadcast of one of the communication signals 195, and if the electrical device 102 is receiving multiple communication signals 195 at the same time.

In the current art, to the extent that electrical devices 102 can receive new and/or updated software/firmware, that software/firmware is pushed by the network manager, in some cases through a WAC 185, to the recipient electrical devices 102. By contrast, using example embodiments, one or more user systems 155 (as opposed to the network manager 180 or a WAC 185) is used to push the new and/or updated software/firmware directly to the recipient electrical devices 102. Also, example embodiments can use one or more different communication protocols (e.g., BLE) relative to what is used by the network manager 180 or a WAC 185 for the purpose of providing new and/or updated software/firmware to the electrical devices 102.

In order to perform these functions, a user system 155 can include a controller that is substantially similar (e.g., in terms of functionality, in terms of components) to the controller 104 of the electrical device 102-1. For example, the controller of a user system 155 can include components such as a storage repository (which includes protocols, algorithms, and stored data), a control engine, a timer, a communication module, and a transceiver. An example of a user system 155 is shown below with respect to FIG. 11.

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of electrical device 102-1 and to a sensor device 165. The communication links 105 can transmit signals (e.g., power signals, communication signals 195 (e.g., RF signals), control signals, data) between the electrical devices 102, the users 150 (including associated user system 155), the sensor devices 165, the WACs 185, and/or the network manager 180. For example, the electrical devices 102 of the system 100 can interact with the one or more user systems 155 by receiving communication signals 195 (e.g., RF signals) over one or more communication links 105, as discussed below. The signals transmitted over the communication links 105 are made up of bits of data, which can include an update to firmware and/or software.

The network manager 180 is a device or component that controls all or a portion of the system 100 that includes a portion (e.g., an app) of one or more of the user systems 155, the controller 104 of one or more of the electrical devices 102, and the WACs 185. The features (e.g., modules) included with and/or the functions performed by the network manager 180 can be substantially similar to those included with and/or performed by the controller 104 and/or a WAC 185. Alternatively, the network manager 180 can include one or more of a number of features and/or perform one or more of a number of functions in addition to, or altered from, the features of the controller 104 and/or a WAC 185, both described below. There can be more than one network manager 180 and/or one or more portions of a network manager 180.

In certain example embodiments, the network manager 180 sends one or more files (e.g., as communication signals 195) to one or more user systems 155, in which case those user systems 155 process the files into modules and blocks, as discussed below. In some cases, a network manager 180 can be called an insight manager, a master controller, or a network controller. In some cases, the network manager 180 receives data from the WACs 185, one or more of the user systems 155, and/or one or more electrical devices 102 and processes this data (e.g., using algorithms 133 and/or protocols 132) to assist in managing the system 100. The network manager 180 can be located in the volume of space 199 or remotely from the volume of space 199. In certain example embodiments, the network manager 180 (e.g., using a controller similar to the controller 104) can maintain software and firmware versions that are used for one or more electrical devices 102.

Each WAC 185 (sometimes more simply called an access controller, as a generic term and/or when wired communication links 105 are involved) performs a number of different functions. For example, a WAC 185 can help communicate with and control the controller 104 of one or more electrical devices 102 to help operate those electrical devices 102. For RTLS applications, the WAC 185 can be responsible for pairing with the Zigbee-enabled integrated sensor devices 165 and/or other electrical devices 102, providing configuration data to the integrated sensor devices 165 and/or other electrical devices 102, synchronizing the timing of those integrated sensor devices 165 and/or other electrical devices 102, supporting the firmware of those integrated sensor devices 165 and/or other electrical devices 102, upgrading those integrated sensor devices 165 and/or other electrical devices 102, receiving location/telemetry data (e.g., using a Zigbee-enabled communication links 105) from the integrated sensor devices 165 and/or other electrical devices 102, and/or performing any other function with respect to those integrated sensor devices 165 and/or other electrical devices 102 to support activities within the system 100.

When a WAC 185 receives data (e.g., packed egress data that arrives as ingress data) from an integrated sensor device 165 and/or other electrical device 102, the WAC 185 can convert the data into a different format (e.g., ECAPI). The WAC 185 can then send the newly-formatted data to the network manager 180. To help diagnose issues, a WAC 185 can maintain counters for each paired integrated sensor device 165 and/or other electrical device 102 and include, for example, the number of received packed data messages from a particular integrated sensor device 165 and/or other electrical device 102, the number of formatted messages successfully transmitted to the network manager 180 that pertain to the packed data from a particular integrated sensor device 165 and/or other electrical device 102, and the number of formatted messages pertaining to the packed data from a particular integrated sensor device 165 and/or other electrical device 102 that failed to transmit to the network manager 180.

In some cases, a WAC 185 maintains the average and maximum latency introduced between the receipt of a message from an integrated sensor device 165 and/or other electrical device 102 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to an integrated sensor device 165 and/or other electrical device 102. When there are multiple WACs 185, they can all be time-synchronized with each other. In some cases, the features (e.g., modules) included with and/or the functions performed by a WAC 185 can be substantially the same as those included with and/or performed by the controller 104 of electrical device 102-1. A WAC 185 can be located in the volume of space 199 or remotely from the volume of space 199.

A user 150 (including an associated user system 155), the network manager 180, one or more sensor devices 165, one or more WACs 185, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150 (including an associated user system 155), the network manager 180, the sensor devices 165, one or more WACs 185, and/or one or more of the other electrical devices 102-N. The user 150 (including an associated user system 155), the network manager 180, the sensor devices 165, one or more WACs 185, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 (including an associated user system 155), the network manager 180, the sensor devices 165, one or more WACs 185, and/or one or more of the other electrical devices 102-N can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within or in communication with the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment, a wet environment). The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150 (including a user system 155), the network manager 180, one or more of the objects 160, the sensor devices 165, one or more WACs 185, and one or more of the other electrical devices 102-N within the system 100. In one or more example embodiments, the storage repository 130 stores one or more protocols 132, one or more algorithms, 133, and stored data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150 (including an associated user system 155), the network manager 180, the one or more of the other electrical devices 102-N, the sensor devices 165, one or more WACs 185, and one or more of the objects 160 (including an associated communication device 190). One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a communication signal 195 and comparing the strength of a communication signal 195 with a threshold value. Algorithms 133 can be used to analyze past data, analyze current data, and/or perform forecasts. One or more particular algorithms 133 can be used in conjunction with one or more particular protocols 132. Stored data 134 can be one or more types of data that is stored in the storage repository. Such data can include, but is not limited to, preferences of a user 150, threshold values, tables (e.g., identification tables, software/firmware updates), results from algorithms 133, historical data (e.g., measurements of sensor devices 165), and nameplate information for equipment (e.g., sensor devices 165, electrical device components 142).

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with a user 150 (including an associated user system 155), the network manager 180, the sensor devices 165, one or more WACs 185, and the other electrical devices 102-N in the system 100. More specifically, the control engine 106 sends information to and/or receives information from the storage repository 130 in order to communicate with a user 150 (including an associated user system 155), the network manager 180, the sensor devices 165, one or more WACs 185, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., a sensor device 165, a WAC 185, a user system 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send communication signals 195 (e.g., RF signals) and/or stop sending communication signals 195 to one or more electrical devices 102 (which can include one or more sensor devices 165) and/or one or more WACs 185 in the system 100. The control engine 106 can also instruct a sensor device 165 to communicate with a WAC 185, with the network manager 180, and/or with the controller 104. This example provides another instance where the control engine 106 can conserve power used by the controller 104 and other components (e.g., the sensor devices 165) of the system 100.

The control engine 106 can organize and manage updates to firmware and/or software received from a user system 155. For example, the control engine 106 can receive, identify, and organize blocks of data that, when completely and properly combined, constitute firmware and/or software instructions or updates thereto. To the extent that the controller 104 is configured to transmit data, to conserve energy, the control engine 106 does not constantly broadcast communication signals 195, but rather only does so at discrete times. The control engine 106 can broadcast a communication signal 195 based on one or more of a number of factors, including but not limited to passage of time, the occurrence of an event, instructions from a user 150 (including an associated user system 155), and a command received from the network manager 180. The control engine 106 can coordinate with the controllers 104 of one or more of the other electrical devices 102-N and/or directly control one or more of the other electrical devices 102-N to broadcast multiple communication signals 195.

One or more protocols 132 and/or algorithms 133 can be used by the control engine 106, upon receiving one or more communication signals 195 (e.g., directly from a user system 155, indirectly through another electrical device 102-N), to determine the content of each communication signal 195. For example, the protocols 132 and/or the algorithms 133 can be used to help the control engine 106 determine whether a communication signal 195 is an indication message or includes a block for a file (e.g., software/firmware update). For example, the control engine 106 can review the contents of a communication signal 195 and determine whether the corresponding electrical device 102-1 is an intended recipient of the communication signal 195 and/or whether the user system 155 is among a list of approved senders of communication signals 195 for the electrical device 102-1. If the electrical device 102-1 is not addressed in the communication signal 195, or if the communication signal 195 is not received from an approved sender (e.g., a user system 155), then the control engine 106 ignores the communication signal 195.

On the other hand, if the electrical device 102-1 is addressed in the communication signal 195, or if the communication signal 195 is received from an approved sender (e.g., a user system 155), then the control engine 106 processes the remaining content of the communication signal 195. The control engine 106, using one or more algorithms 133 and/or one or more protocols 132, can also establish one or more tables to store and organize the information contained in and extracted from the various communication signals 195 broadcast by a user system 155. Such tables can be stored as stored data 134 in the storage repository 130. In maintaining a table, the control engine 106 of the controller 104 can purge items due to inactivity, a more recent version of an instruction, a new protocol for operations, and/or for some other reason.

In some cases, control engine 106 of the controller 104 can further use the protocols 132 and/or the algorithms 133 to determine whether a certain amount of time (e.g., a threshold value of time) has passed since an initial communication signal 195 in a sequence or series of communication signals 195 has been received. In such a case, the control engine 106 can purge the record of the original identification and/or the alternative identification of the object 160 (including the associated communication device 190).

In some cases, a controller of a WAC 185 and/or the network manager 180 (as opposed to the controller 104 of the electrical device 102-1) can perform one or more of the functions described herein with respect to the electrical device 102-1. In such a case, such functions can be performed by the controller of a WAC 185 and/or the network manager 180 in place of the controller 104 of the electrical device 102-1 and/or in parallel with the controller 104 of the electrical device 102-1.

The control engine 106 can provide control signals, communication signals 195, and/or other signals to a user 150 (including an associated user system 155), the network manager 180, the other electrical devices 102-N, the sensor devices 165, and one or more WACs 185. Similarly, the control engine 106 can receive control signals, communication signals 195, and/or other signals from a user 150 (including an associated user system 155), the network manager 180, the other electrical devices 102-N, the sensor devices 165, and one or more WACs 185. The control engine 106 can communicate with each user 150 (including an associated user system 155) automatically (for example, based on one or more algorithms 133 stored in the storage repository 130) and/or based on control signals, communication signals 195, and/or other signals received from another device (e.g., the network manager 180, a WAC 185, another electrical device 102-N). The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and a user 150 (including an associated user system 155), the network manager 180, the other electrical devices 102-N, the sensor devices 165, and one or more WACs 185.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using example embodiments, while at least a portion (e.g., the control engine 106, the timer 110) of the controller 104 is always on, the remainder of the controller 104 can be in sleep mode when they are not being used. In addition, the controller 104 can control certain aspects (e.g., sending communication signals 195 to and receiving communication signals 195 from a user system 155 of a user 150) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and a user 150 (including an associated user system 155), the network manager 180, the sensor devices 165, one or more WACs 185, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user system 155), the network manager 180, the other electrical devices 102-N, the sensor devices 165, and/or one or more WACs 185. In some cases, the communication module 108 accesses the stored data 134 to determine which protocol 132 for communication is within the capability of a user system 155 of a user 150 for a communication signal 195 sent by the control engine 106. In addition, the communication module 108 can interpret the protocol 132 for communication of a communication signal 195 (e.g., a RF signal) received by the controller 104 so that the control engine 106 can interpret the communication.

The communication module 108 can send data (e.g., protocols 132, stored data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the amount of time between blocks for a related set of data (e.g., firmware upgrade) that are received from a user system 155. The timer 110 can track time periods based on an instruction received from the control engine 106, based on an instruction received from the user 150 (including a user system 155), based on an instruction programmed in the software for the controller 104, based on the last instance that a communication signal 195 was received from a particular user system 155 of a user 150, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to one or more other components (e.g., the power supply 140, a sensor device 165, an electrical device component 142) of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102-1 and generates power of a type (e.g., alternating current, direct current) and level (e.g., 12V, 24V, 120V) that can be used by the other components of the controller 104 and/or by another component of the electrical device 102-1. In addition, or in the alternative, the power module 112 can be a source of power in itself to provide signals to the other components of the controller 104 and/or another component of the electrical device 102-1. For example, the power module 112 can include an energy storage device (e.g., a battery). As another example, the power module 112 can include a localized photovoltaic power system.

The hardware processor 120 of the controller 104 executes software in accordance with one or more example embodiments. Specifically, the hardware processor 120 can execute software and/or firmware on the control engine 106 or any other portion of the controller 104, as well as software and/or firmware used by a user 150 (including an associated user system 155), the network manager 180, the sensor devices 165, one or more WACs 185, and/or one or more of the other electrical devices 102-N. The hardware processor 120 can be or include an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals 195 (e.g., RF signals). Specifically, the transceiver 124 can be used to transfer data between the controller 104 and a user 150 (including an associated user system 155), the network manager 180, the other electrical devices 102-N, one or more of the sensor devices 165, and/or one or more WACs 185. The transceiver 124 can use wired and/or wireless technology. The transceiver 124 can be configured in such a way that the control and/or communication signals 195 sent and/or received by the transceiver 124 can be received and/or sent by another transceiver that is part of a user 150 (including an associated user system 155), the network manager 180, the other electrical devices 102-N, one or more sensor devices 165, and/or one or more WACs 185.

When the transceiver 124 uses wireless technology, any type of wireless technology can be used by the transceiver 124 in sending and receiving signals (e.g., communication signals 195). Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving signals, including communication signals 195. Such communication protocols can be stored in the protocols 132 of the storage repository 130. Further, any transceiver information for a user 150 (including an associated user system 155), the network manager 180, the other electrical devices 102-N, the sensor devices 165, and/or one or more WACs 185 can be part of the stored data 134 (or similar areas) of the storage repository 130.

In some cases, the transceiver 124 and/or the communication module 108 of the electrical device 102-1 can have limited capabilities. For example, in certain example embodiments, the transceiver 124 and/or the communication module 108 of the electrical device 102-1 is configured to receive communication signals 195 using BLE from another component (e.g., the network manager 180, a user system 155) of the system 100, but the transceiver 124 and/or the communication module 108 is not configured to transmit communication signals 195 using BLE. Such a limitation of the transceiver 124 and/or the communication module 108 can be imposed for any of a number of reasons, including but not limited to saving cost, operational efficiency, and bandwidth conservation on the communication links 105.

Optionally, in one or more example embodiments, the security module 128 secures interactions between the controller 104, a user 150 (including an associated user system 155), the network manager 180, the other electrical devices 102-N, the sensor devices 165, and/or one or more WACs 185. More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 can provide power to one or more of the power module 112 of the controller 104, the electrical device components 142, one or more of the sensor devices 165, the optional switch 145, and/or the optional antennae 175. The power supply 140 can be substantially the same as (e.g., in terms of functionality, in terms of components), or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104, the electrical device components 142, one or more of the sensor devices 165, the optional switch 145, and/or the optional antennae 175. The power supply 140 can generate power of a type (e.g., alternating current, direct current) and level (e.g., 12V, 24V, 120V) that can be used by the recipients (e.g., the electrical device components 142, the power module 112 of the controller 104) of such power. In addition, or in the alternative, the power supply 140 can receive power from a source (e.g., AC mains, an electrical outlet) external to the electrical device 102-1. In addition, or in the alternative, the power supply 140 can be or include a source of power in itself. For example, the power supply 140 can include an energy storage device (e.g., a battery), a localized photovoltaic power system, and/or some other source of independent power.

Each of the one or more sensor devices 165 of the electrical device 102-1 can include any type of sensor that measures one or more parameters. Examples of types of sensors of sensor devices 165 can include, but are not limited to, a passive infrared sensor, a photocell, a pressure sensor, an air flow monitor, a gas detector, and a resistance temperature detector. Examples of a parameter that is measured by a sensor of a sensor device 165 can include, but are not limited to, occupancy in the volume of space 199, motion in the volume of space 199, a temperature, a level of gas, a level of humidity, an amount of ambient light in the volume of space 199, and a pressure wave. A sensor device 165 can have one sensor or multiple sensors. In some cases, the parameter or parameters measured by a sensor of a sensor device 165 can be used to operate one or more of the electrical device components 142 of the electrical device 102-1. In some cases, the one or more parameters measured by a sensor of a sensor device 165 can be used to locate one or more objects in the volume of space 199.

In some cases, a sensor device 165 can be an integrated sensor device 165, which can be considered a type of electrical device 102. An integrated sensor device 165 has both the ability to sense and measure at least one parameter and the ability to independently communicate with another component (e.g., a user system 155 of a user 150, a WAC 185). The communication capability of an integrated sensor device 165 can include one or more communication devices that are configured to communicate with, for example, the controller 104 of the electrical device 102-1, a WAC 185, a user system 155 of a user 150, the network manager 180, and/or a controller (substantially similar to the controller 104 described herein) of another electrical device 102-N. For example, an integrated sensor device 165 can include a sensor that is a passive infrared (PIR) sensor, a transceiver that sends and receives signals (e.g., communication signals 195) using Zigbee, a receiver that receives signals (e.g., communication signals 195) using BLE, and a receiver that actively receives IR signals. In such a case, the PIR sensor measures IR light radiating from objects in its field of view within the volume of space 199, often for the purpose of detecting motion.

Each integrated sensor device 165 can use one or more of a number of communication protocols. This allows an integrated sensor device 165 to communicate with one or more components (e.g., a user system 155 of a user 150, a WAC 185, one or more other integrated sensor devices 165) of the system 100. The communication capability of an integrated sensor device 165 can be dedicated to the sensor device 165, shared with one or more other sensor devices 165 that are not integrated, and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of an integrated sensor device 165 is dedicated to the integrated sensor device 165, then the integrated sensor device 165 can include one or more components (e.g., memory 122, a storage repository 130, a transceiver 124, a communication module 108), or portions thereof, that are substantially similar to the corresponding components described above with respect to the controller 104. A sensor device 165 (whether integrated or not) can be associated with the electrical device 102-1 and/or another electrical device 102 in the system 100. A sensor device 165 (whether integrated or not) can be located within the housing 103 of the electrical device 102-1, disposed on the housing 103 of the electrical device 102-1, or located outside the housing 103 of the electrical device 102-1.

Figure 9:
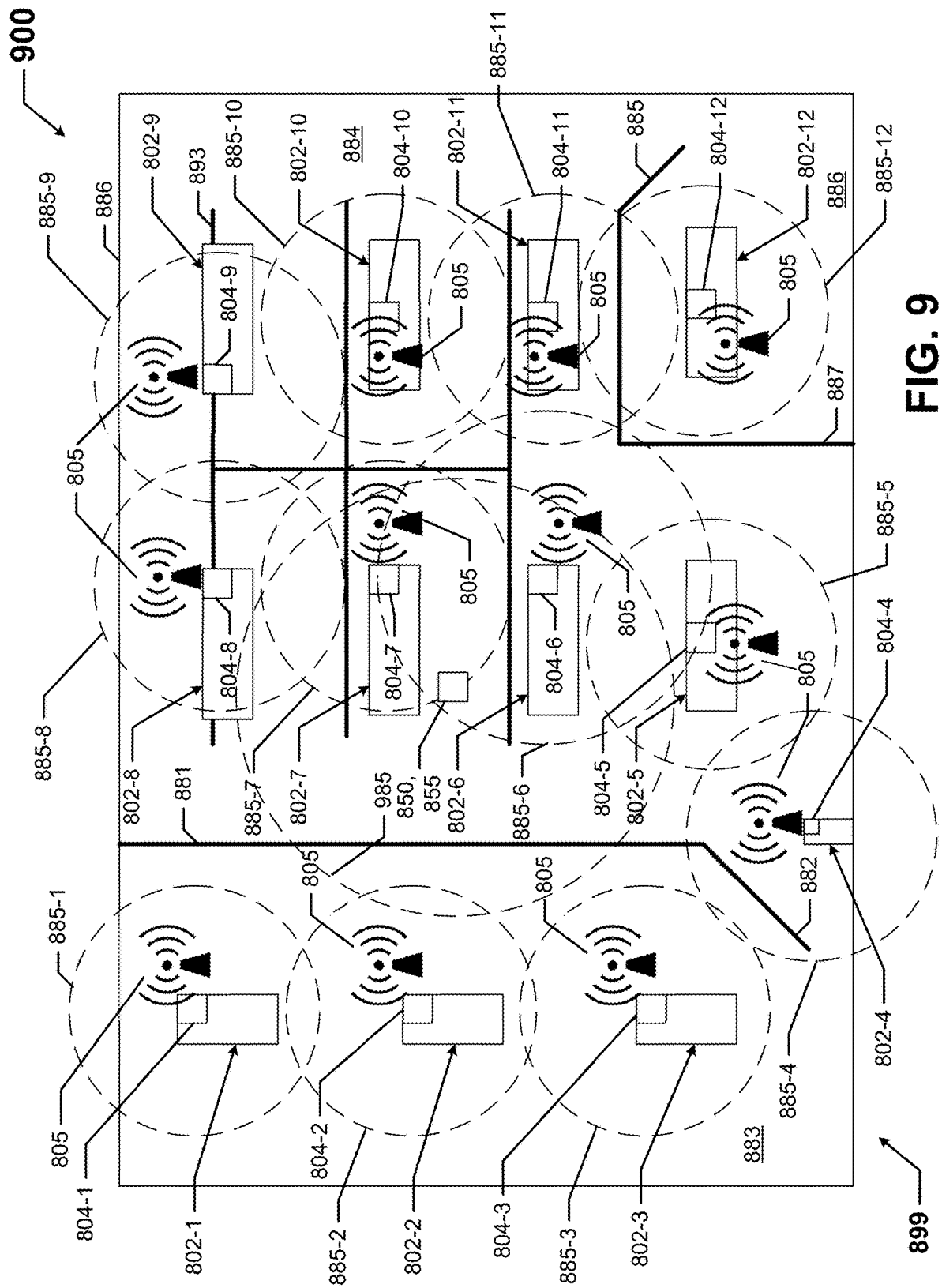
FIG. 9 shows yet another system in accordance with certain example embodiments.

In certain example embodiments, a sensor device 165 (whether integrated or not) can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. The controller 104 can provide the functionality of these components used by the sensor device 165. Alternatively, the sensor device 165 can be integrated and include, either on its own or in shared responsibility with the controller 104, one or more of the components of the controller 104. In such a case, the integrated sensor device 165 can correspond to a computer system as described below with regard to FIG. 2. An example of an integrated sensor device is shown below with respect to FIG. 9.

In some cases, as with the transceiver 124 and/or the communication module 108 of the electrical device 102-1, the transceiver and/or the communication module of an integrated sensor device 165 can have limited capabilities. For example, in certain example embodiments, the transceiver and/or the communication module of the electrical device 102-1 is configured to receive communication signals 195 using BLE from another component (e.g., the network manager 180, a user system 155) of the system 100, but the transceiver and/or the communication module is not configured to transmit communication signals 195 using BLE. Such a limitation of the transceiver and/or the communication module can be imposed for any of a number of reasons, including but not limited to saving cost, operational efficiency, and bandwidth conservation on the communication links 105.

As discussed above, the electrical device 102-1 can include one or more optional antennae 175. An antenna 175 is an electrical device that converts electrical power to communication signals 195 (e.g., RF signals) (for transmitting) and communication signals 195 to electrical power (for receiving). In transmission, a radio transmitter (e.g., part of the transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as signals (e.g., communication signals 195). In reception, an antenna 175, when included in the electrical device 102-1, intercepts some of the power of communication signals 195 in order to produce a tiny voltage at its terminals, that is applied to a receiver (e.g., part of the transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102-1, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
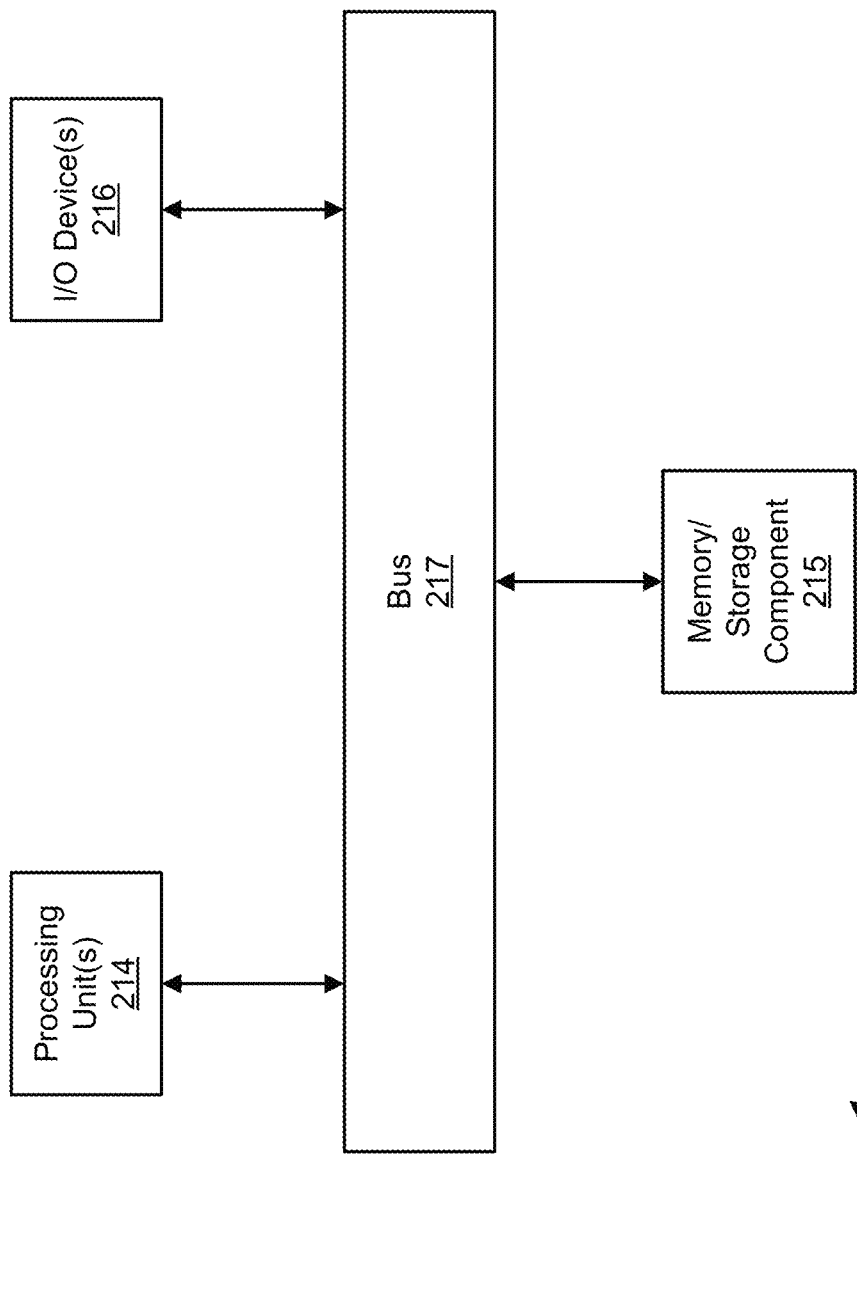
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
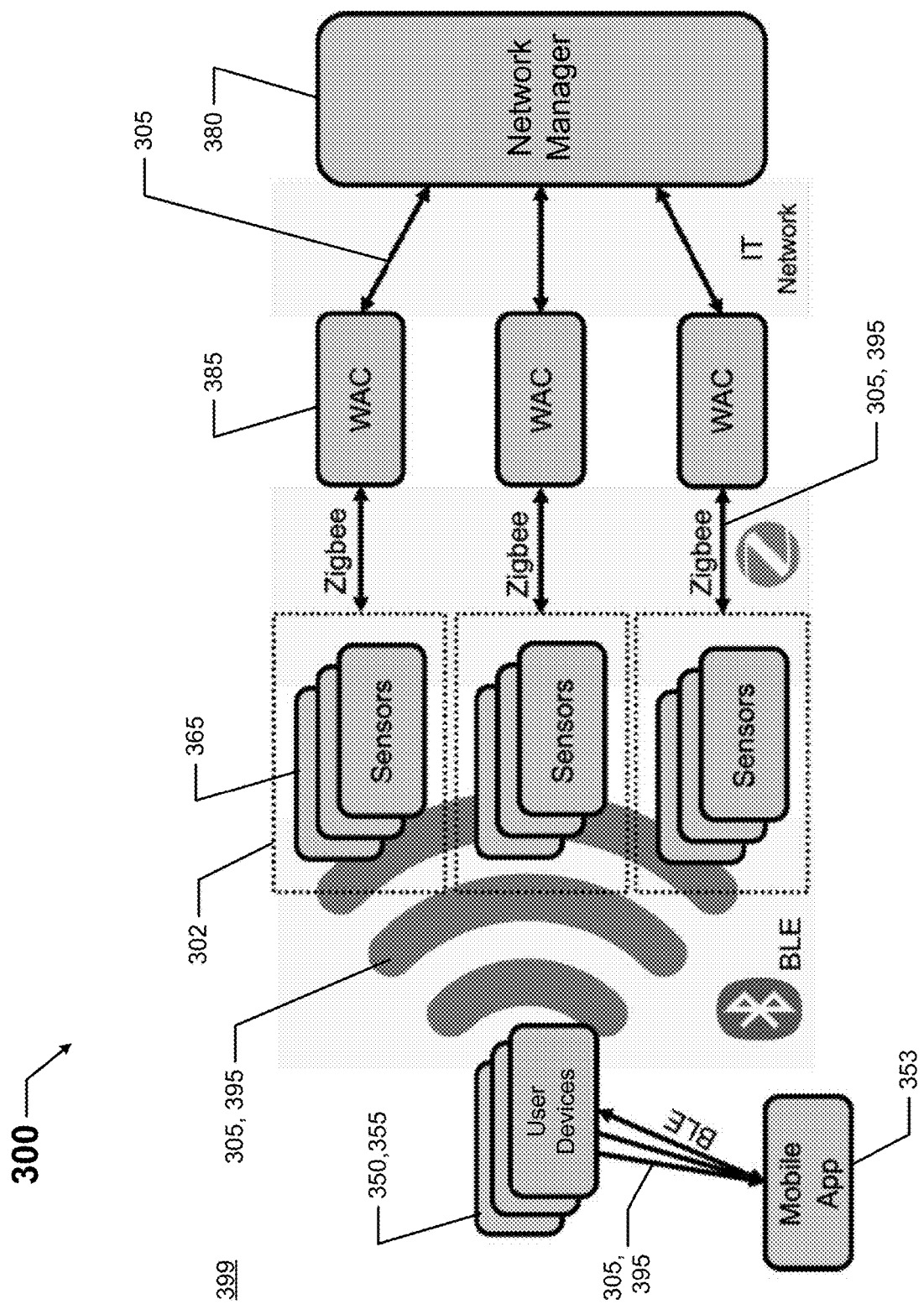
FIG. 3 shows a diagram of another system in accordance with certain example embodiments.

FIG. 3 shows a diagram of another RTLS system 300 in accordance with certain example embodiments. Referring to FIGS. 1 through 3, the RTLS system 300 includes a user 350 with a user system 355, a number of electrical devices 302 each having one or more sensor devices 365, a number of WACs 185, and a network manager 380. Each of these components of the system 300 of FIG. 3 can be substantially the same as the corresponding component of the RTLS system 100 of FIG. 1. For example, each sensor device 365 can include a Zigbee-enabled transceiver, a BLE-enabled receiver, a PIR sensor, and an active IR receiver. In such a case, the sensor device 365 lacks a BLE-enabled transmitter.

In this particular case, each of the user systems 355 is associated with a particular user 350. In this example, the user systems 355 use BLE (a form of communication link 305 to "beacon" RF signals 395 at a certain rate. A beacon is a broadcast message that, at a minimum, identifies the electrical device 302 (which can include a sensor device 365 if integrated) associated with the sending user system 355. In other words, the RF signals 395 sent by a user system 355 can be addressable to one or more specific electrical devices 302. The integrated sensor device 365 or other electrical device 302 receives these RF signals 395 over the BLE-enabled communication links 305. When the RF signals 395 include blocks of data that is part of a software/firmware update or other larger communication, the integrated sensor device 365 or other electrical device 302 can identify, organize, store, and integrate those blocks to achieve the overall communication.

This RSSI information is the key piece of data in a RF signal 390 that allows a controller 385 and/or network manager 380 to locate, in real time, the communication device 390 (and corresponding object 360) within a volume of space 399 (e.g., in X-Y coordinates, in X-Y-Z coordinates). As used herein, "real time" refers to a user's perspective of the system and means that objects can be located within the time in which the signals are transmitted and processed, such as a few milliseconds to within a few seconds, which time is virtually real time from the user's perspective. Integrated sensor devices 365 communicate with one or more controllers 385 (in this example, WACs 385) using Zigbee-enabled communication links 305. In this case, an integrated sensor device 365 is a Zigbee-enabled device as well as a BLE-enabled device, and so a sensor device 365 can be paired with a single WAC 385.

Communications between a sensor device 365 and a WAC 385 can be limited by one or more of a number of factors. For example, the bandwidth by existing Zigbee (or other communication method) protocols for the communication link(s) 305 between the sensor device 365 and the WAC 385 can limit communications capability. As another example, the capability (e.g., messages per second) of the WAC 385 can limit communications capability. As yet another example, the overall communication activity on the Zigbee-enabled communication links 305, involving all sensor device 365 and WACs 385 at a given point in time, can limit communications capability. With all of these potential constraints, intelligent use of the Zigbee-enabled communication links 305 is fundamental to the success of the RTLS system 300 in locating an object 360 accurately in real time.

The WACs 385, upon receiving the signals from the sensor devices 365 on the Zigbee-enabled communication links 305, send the information in these signals to the network manager 380, which process all of this information (e.g., using one or more algorithms 133) to locate each object 360 within the volume of space 399 in real time. The network manager 380 can store this information and use it for trending analysis, predictive analysis, and/or any other analysis that may be useful.

BLE proximity methods are widely used in the industry to estimate the distance between a BLE transmitter (in this case, a communication device 390 of an object 360) and a BLE receiver (in this case, a sensor device 365). In a dense and uniformly distributed infrastructure of electrical devices 302 (e.g., a lighting system), these methods can be optimized to achieve greater accuracy by comparing the RSSI at many BLE receivers and performing various calculations (by a WAC 385 or network manager 380) to estimate the location of an object 360.

Reasonable accuracy can be expected with these methods, but two significant challenges are encountered using BLE communication systems. First, the large number of electrical devices 302 (sensor devices 365 or nodes) creates large amounts of data, and the communication network of the system 300 has limited bandwidth. Not all data that is transmitted is useful in establishing the location of an object 360, and care must be taken to provide the best data possible to a WAC 385 or network manager 380 while still maintaining a healthy (e.g., not data constrained) network. In other words, the principal purpose (e.g., lighting) of the system 300 for which the electrical devices 302 is designed should not be affected by the efforts of the system 300 to also locate one or more objects 360 in real time.

Second, no matter how accurate the location estimations of objects 360 are, there can be challenges in achieving reliable room-level or even floor-level accuracy of locating an object 360 using RF signals 395 in the volume of space 399 because RF signals 395 (e.g., transmitted at 2.4 GHz in a BLE-enabled communication network) can penetrate barriers such as walls and floors. As a result, these barriers can cause the location of an object 360 to be falsely identified. Other location methods using example embodiments are needed to accurately locate objects 360 in real time in volumes of space that have such barriers and/or present other challenges to existing location methods.

Figure 4:
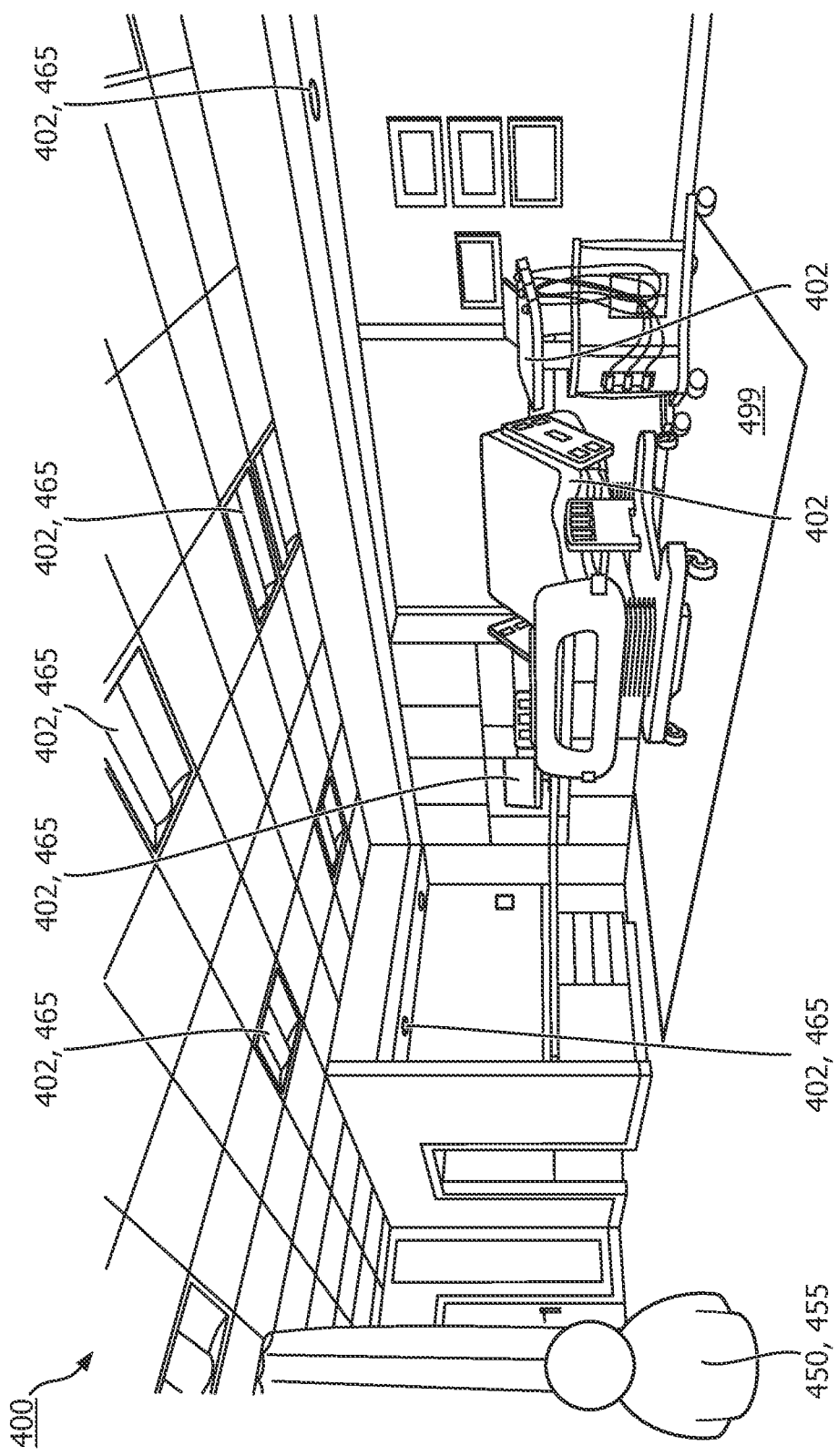
FIG. 4 shows a system where a user system pushes data to a number of electrical devices in accordance with certain example embodiments.

FIG. 4 shows a system 400 where a user system 455 of a user 450 pushes data to a number of electrical devices 402 in accordance with certain example embodiments. Referring to FIGS. 1 through 4, the system 400 includes a number of electrical devices 402, principally in the form of light fixtures, located in a volume of space 499 that includes a hospital room. A system with a number of electrical devices 402 in the form of light fixtures can provide unique advantages for implementing example embodiments because the density of the light fixtures supports a dense network of sensors for communicating with each other using certain protocols, such as BLE.

Of the electrical devices 402 that are light fixtures, there are seven troffer light fixtures and five down can light fixtures disposed in the ceiling. There are also electrical devices 402 in the form of a computer monitor, a test cart, and a controller for a bed. In this case, each electrical device 402 in the form of a light fixture includes a sensor device 465, substantially similar to the sensor devices 165 discussed above. One or more of these sensor devices 465 can be integrated sensor devices 465, in which case those integrated sensor devices 465 can each be considered an electrical device 402. The user system 455 (e.g., a cell phone) is in the possession of a user 450 (e.g., a physician), and both are located in the volume of space 499.

Under a particular communication protocol (e.g., BLE), the user system 455 has a communication range (discussed below) that overlaps with the communication range of each of the electrical devices 402 of the system 400. As a result, the user system 455 can communicate directly with each of the electrical devices 402, including any integrated sensor devices 465. In this way, the user system 455, through an app, can broadcast multiple communication signals (e.g., communication signals 195) related to providing new or updated information (e.g., software/firmware) to one or more of the electrical devices 402, including any integrated sensor devices 465.

Figure 5:
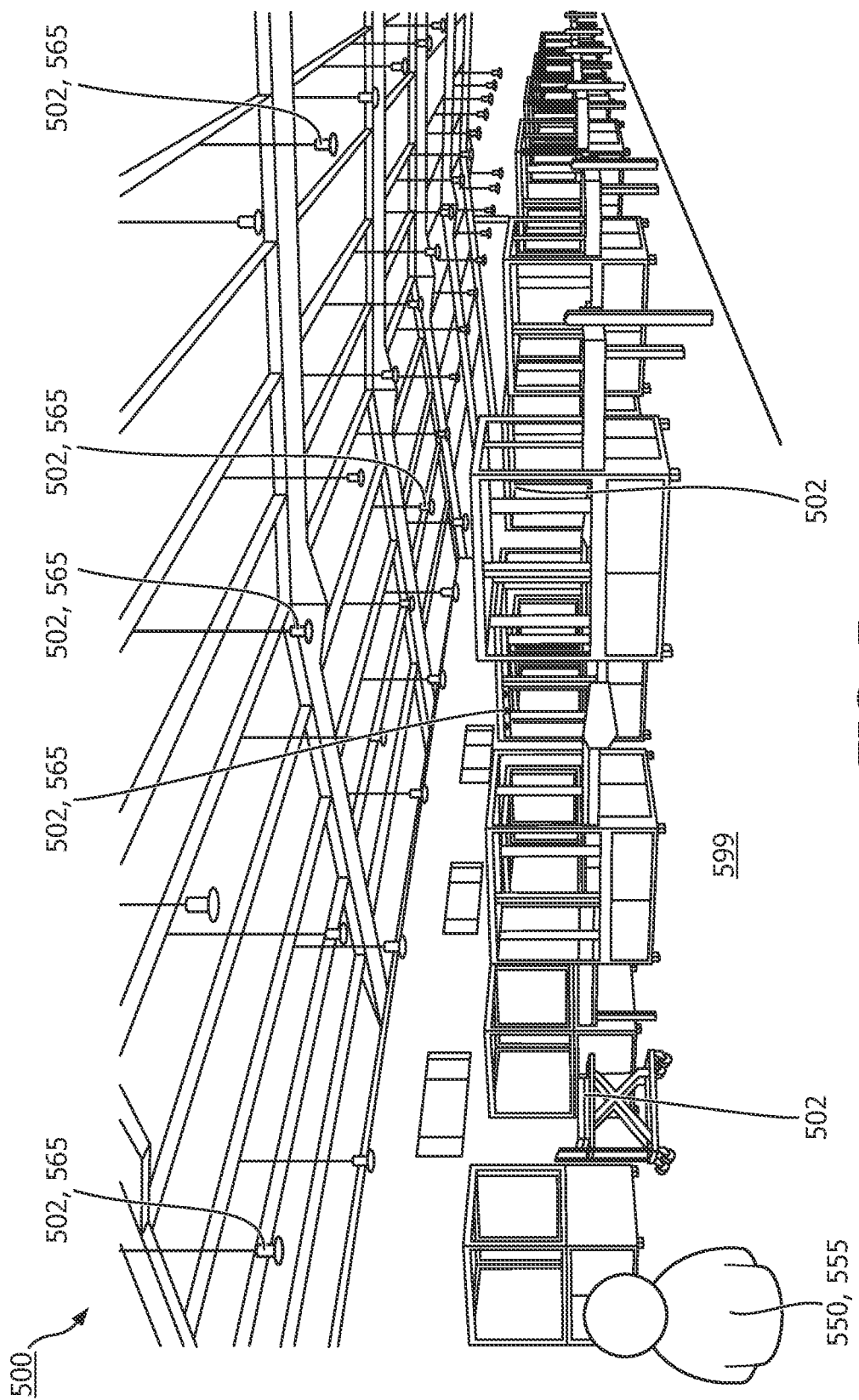
FIG. 5 shows another system where a user system pushes data to a number of electrical devices in accordance with certain example embodiments.

FIG. 5 shows another system 500 where a user system 555 of a user 550 pushes data to a number of electrical devices 502 in accordance with certain example embodiments. Referring to FIGS. 1 through 5, the lighting system 500 includes a number of electrical devices 502, principally in the form of light fixtures, located in a volume of space 599 that includes a manufacturing facility.

Of the electrical devices 502 that are light fixtures, there are at least 56 Hi-Bay light fixtures suspended from the ceiling and at least 30 work stations located on the floor. In this case, each electrical device 502 in the form of light fixtures includes a sensor device 565, substantially similar to the sensor devices 165 discussed above. One or more of these sensor devices 565 can be integrated sensor devices 565, in which case those integrated sensor devices 565 can each be considered an electrical device 502. The user system 555 (e.g., a cell phone) is in the possession of a user 550 (e.g., a physician), and both are located in the volume of space There are also electrical devices 502 in the form of a controller at a work station and a testing device on a cart. computer monitor, a test cart, and a controller for a bed. The user system 555 (e.g., a hand-held control device) is in the possession of a user 550 (e.g., a production manager), and both are located in the volume of space 599. In this case, under a particular communication protocol (e.g., BLE), the user system 555 has a communication range that overlaps with the communication range of at least one of the electrical devices 502 of the system 500. Assuming that the communication range of each electrical device 502 in the system 500 overlaps with the communication range at least one other electrical device 502 in the system 500, the user system 555 can communicate, directly or indirectly, with each of the electrical devices 502, including any integrated sensor devices 565. In this way, the user system 555, using an app, can broadcast multiple communication signals (e.g., communication signals 195) related to providing new or updated information (e.g., software/firmware) to one or more of the electrical devices 502.

Figure 6B:
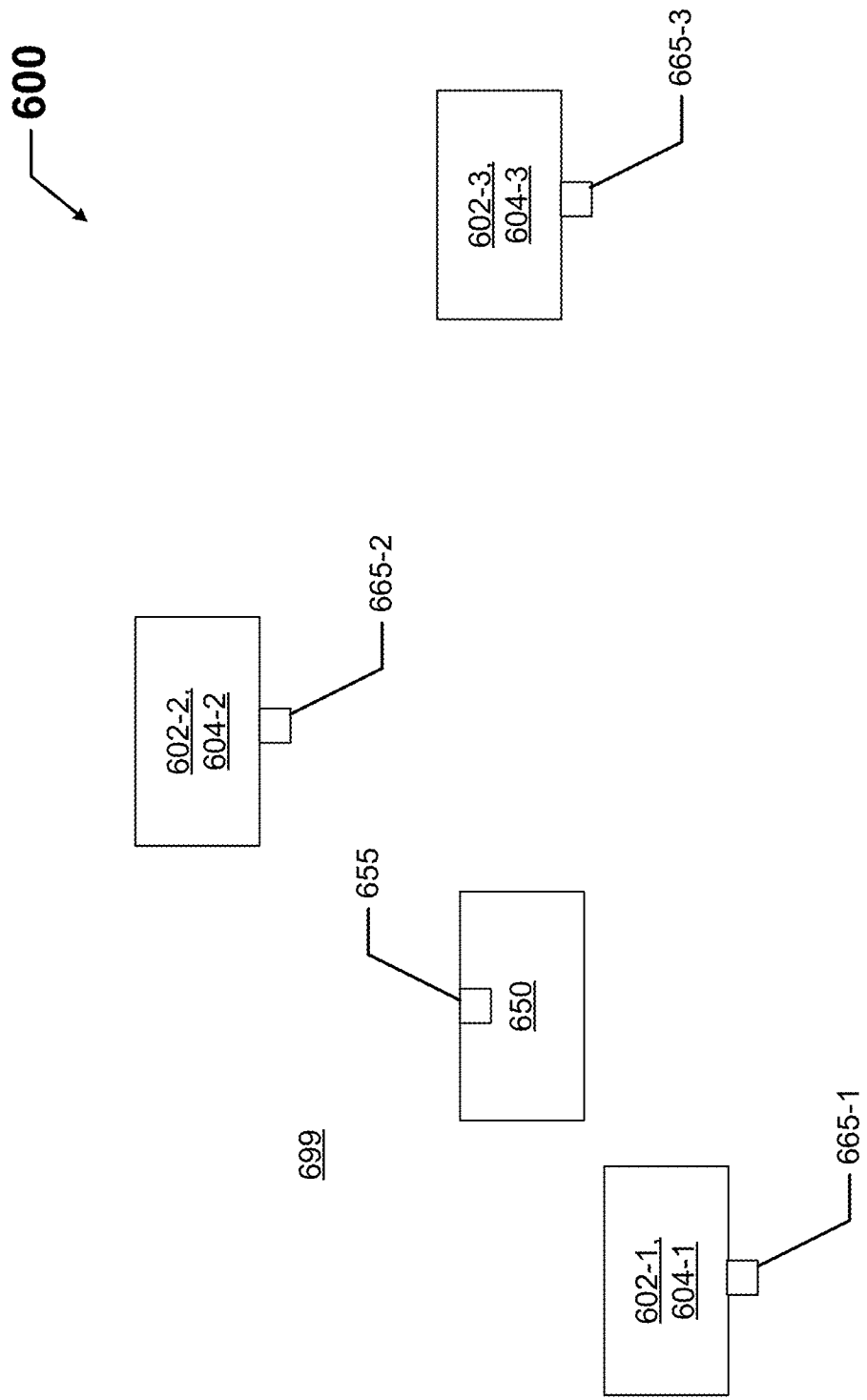

FIGS. 6A and 6B show a side and top view, respectively, of a system 600 that includes a user system 655 and a number of electrical devices 602 located in volume of space 699 in accordance with certain example embodiments. Referring to FIGS. 1 through 6B, within the volume of space 699 of FIGS. 6A and 6B are three electrical devices 602 (specifically, electrical device 602-1, electrical device 602-2, and electrical device 602-3), where the electrical devices 602 are types of luminaires. Electrical device 602-1 includes a controller 604-1, electrical device 602-2 includes a controller 604-2, and electrical device 602-3 includes a controller 604-3.

The user system 655 (e.g., an electronic tablet) in this case is in the possession of a user 650 (e.g., an electrician), and both are located in the volume of space 699 along with the three electrical devices 602. The user 650, the user system 655, and each electrical device 602 and associated controller 604 of the system 600 of FIGS. 6A and 6B are substantially similar to the corresponding components of the system 100 of FIG. 1 above. As discussed above, the volume of space 699 can be of any size and/or in any location. For example, the volume of space 699 can be one or more rooms in an office building.

As shown in FIGS. 6A and 6B, all of the electrical devices 602 can be located in the volume of space 699. Alternatively, one or more of the electrical devices 602 can be located outside the volume of space 699, as long as the communication signals (e.g., RF signals) sent by the user system 655 of the user 650 are received by the transceiver of the controller 604 of the corresponding electrical device 602.

Also, each of the electrical devices 602 in the system 600 of FIGS. 6A and 6B include a sensor device 665, which is substantially similar to the sensor device 165 of FIG. 1. Specifically, sensor device 665-1 is attached to electrical device 602-1, sensor device 665-2 is attached to electrical device 602-2, and sensor device 665-3 is attached to electrical device 602-. One or more of these sensor devices 665 can be integrated, in which case that integrated sensor device 665 can individually receive the communication signals broadcast by the user system 655 independent of the electrical device 602 to which that integrated sensor device 665 is attached. In this case, each controller 604 of the electrical devices 602 (and of any integrated sensor device 665 that may exist in the system 600) can include a BLE-enabled receiver.

Figure 7:
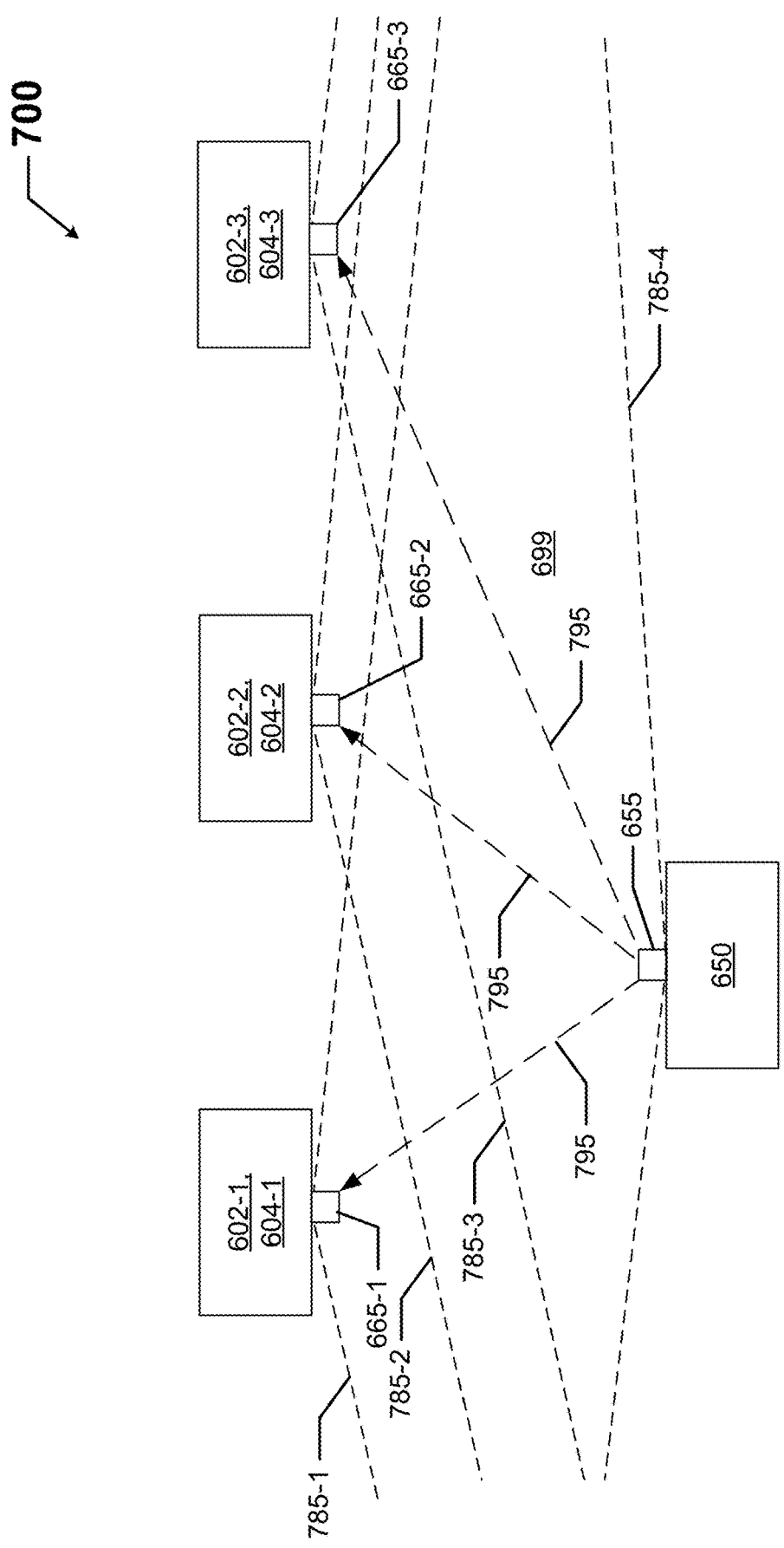
FIG. 7 shows the system of FIGS. 6A and 6B when a communication signal is sent by the user system in accordance with certain example embodiments.

FIG. 7 shows the system 700 of FIGS. 6A and 6B when a communication signal 795 (substantially similar to the communication signal 195 of FIG. 1 above) is sent by the user system 655 of the user 650 in accordance with certain example embodiments. Referring to FIGS. 1 through 7, The controller 604 of each electrical device 602 has a broadcast range 785. In this case, controller 604-1 of electrical device 602-1 has broadcast range 785-1, controller 604-2 of electrical device 602-2 has broadcast range 785-2, and controller 604-3 of electrical device 602-3 has broadcast range 785-3. Similarly, the user system 655 also has a broadcast range 785-4.

Since the broadcast range 785-4 of the user system 655 overlaps with the broadcast range 785-1 for the controller 604-1 of electrical device 602-1, the controller 604-1 of electrical device 602-1 directly receives the communication signal 795 broadcast by the user system 655. In addition, since the broadcast range 785-4 of the user system 655 overlaps with the broadcast range 785-2 for the controller 604-2 of electrical device 602-2, the controller 604-2 of electrical device 602-2 directly receives the communication signal 795 broadcast by the user system 655. Finally, the broadcast range 785-4 of the user system 655 overlaps with the broadcast range 785-3 for the controller 604-3 of electrical device 602-3, the controller 604-3 of electrical device 602-3 directly receives the communication signal 795 broadcast by the user system 655.

If an integrated sensor device 665 exists in the system 600, then each integrated sensor device 665 can have its own broadcast range. In such a case, if the broadcast range of an integrated sensor device 665 overlaps with the broadcast range 785-4 of the user system 655, then the integrated sensor device 665 can directly receive the communication signal 795 broadcast by the user system 655. In the event that any of the electrical devices 604 or integrated sensor devices 665 of the system 600 have a communication range 785 that does not overlap with the communication range 785-4 of the user system 655, that electrical device 604 or integrated sensor device 665 can still indirectly receive the communication signal 795 if such electrical device 604 or integrated sensor device 665 has a communication range 785 that overlaps with the communication range 785 of another electrical device 604 or integrated sensor device 665 that receives the communication signal 795785785.

The communication signal 795 can be sent, as an example, using BLE, which makes the communication signal 795 a RF signal. As discussed above, the communication signal 795 broadcast by the user system 655 of the user 650 can include, for example, the UUID of the user system 655, a block of an instruction, the number of the block, the file to which the block is associated, the version of the file, and a recipient ID of an electrical device and/or integrated sensor device 665.

Figure 8:
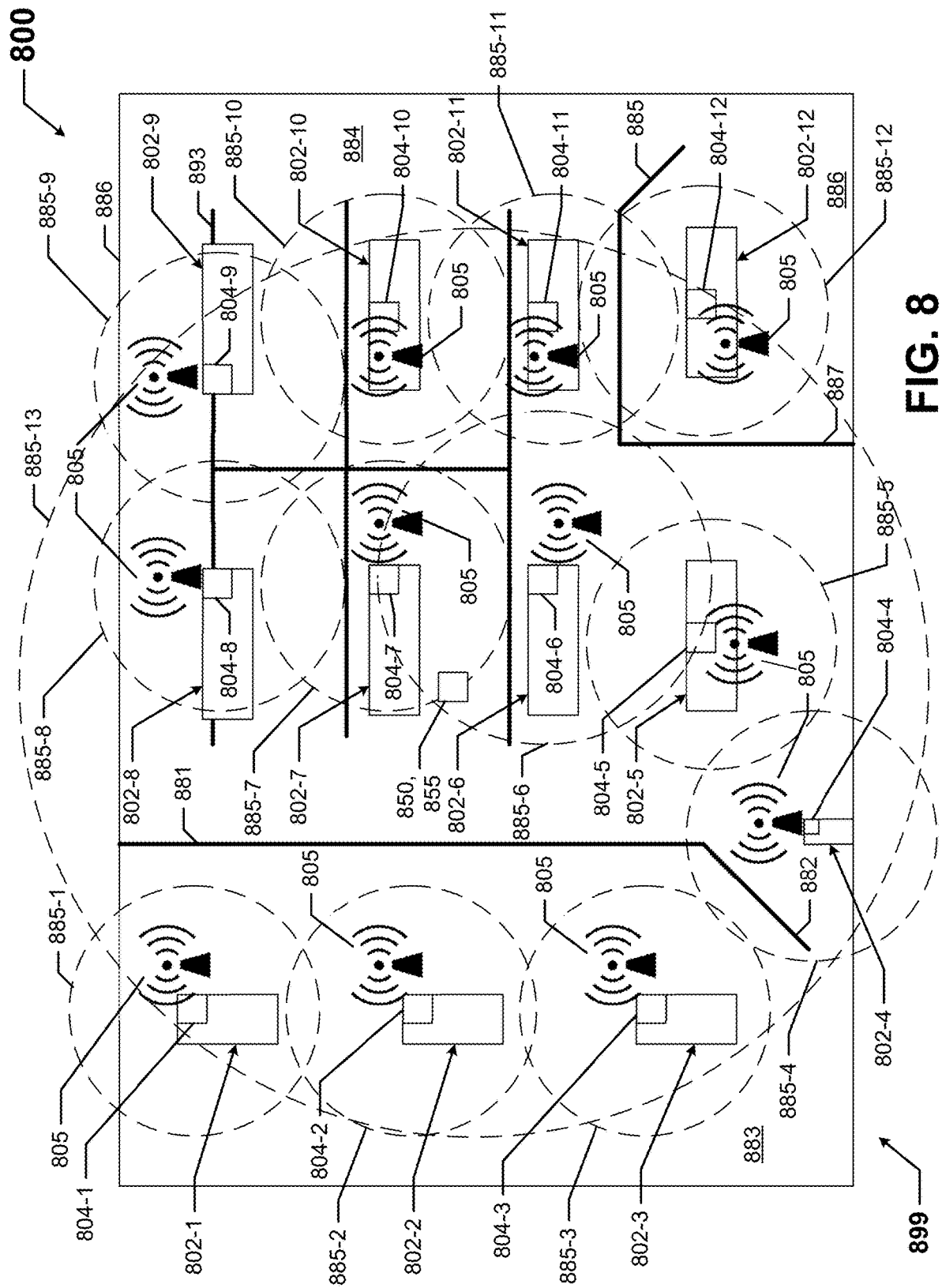
FIG. 8 shows another system in accordance with certain example embodiments.

FIG. 8 shows another system 800 in accordance with certain example embodiments. Referring to FIGS. 1 through 8, the system 800 is located in a volume of space 899 in the form of an office suite (or portion thereof). Each room in the volume of space 899 includes one or more of a number of electrical devices 802. The electrical devices 802 shown in FIG. 8 are not exclusive and are not meant to be limiting in terms of the number and/or type of electrical devices that can be found in the volume of space 899. Also, each electrical device 802 of FIG. 8 can be part of one or more of a number of electrical systems. Examples of such electrical systems can include, but are not limited to, a lighting system, a security system, an audio-visual system, an electrical outlet system, an emergency system, a fire protection system, and a HVAC system.

The volume of space 899 in FIG. 8 includes a hallway 883, an office 886, and a workspace 884. The hallway 883 includes three electrical devices 802 (electrical device 802-1, electrical device 802-2, and electrical device 802-3) in the form of light fixtures. The office 886 within the work space 884 of FIG. 8 includes an electrical device 802-12 in the form of a light fixture. The work space 884 includes an electrical device 802-4 in the form of an illuminated exit sign and seven electrical devices 802 (electrical device 802-5, electrical device 802-6, electrical device 802-7, electrical device 802-8, electrical device 802-9, electrical device 802-10, and electrical device 802-11) in the form of light fixtures. The volume of space 899 can also have any of a number of other electrical devices (e.g., electrical outlets, cameras, thermostats), but are not shown in FIG. 8 to make the features in FIG. 8 easier to distinguish.

Each of the electrical devices 802-1 through 802-12 in the volume of space 899 of FIG. 8 can include a controller 804. Each electrical device 802 and corresponding controller 804 in FIG. 8 can be substantially similar to the electrical device 102-1 and the controller 104 with respect to FIG. 1 above. For example, each controller 804 includes a transceiver (e.g., transceiver 124), and each transceiver in this example receives communication signals (e.g., communication signals 195). These communication signals are transmitted using the communication links 805 by which the electrical devices 802 of FIG. 8 can communicate with each other and with the user system 855 of the user 850. Each controller 804 (or transceiver thereof) has a communication range 885 (e.g., 10 meters) that defines a maximum area or volume of space in which the transceiver can receive signals.

For example, electrical device 802-1 includes a controller 804-1, where the transceiver of the controller 804-1 has a communication range 885-1. Electrical device 802-2 includes a controller 804-2, where the transceiver of the controller 804-2 has a communication range 885-2. Electrical device 802-3 includes a controller 804-3, where the transceiver of the controller 804-3 has a communication range 885-3. Electrical device 802-4 includes a controller 804-4, where the transceiver of the controller 804-4 has a communication range 885-4. Electrical device 802-5 includes a controller 804-5, where the transceiver of the controller 804-5 has a communication range 885-5. Electrical device 802-6 includes a controller 804-6, where the transceiver of the controller 804-6 has a communication range 885-6.

Electrical device 802-7 includes a controller 804-7, where the transceiver of the controller 804-7 has a communication range 885-7. Electrical device 802-8 includes a controller 804-8, where the transceiver of the controller 804-8 has a communication range 885-8. Electrical device 802-9 includes a controller 804-9, where the transceiver of the controller 804-9 has a communication range 885-9. Electrical device 802-10 includes a controller 804-10, where the transceiver of the controller 804-10 has a communication range 885-10. Electrical device 802-11 includes a controller 804-11, where the transceiver of the controller 804-11 has a communication range 885-11. Electrical device 802-12 includes a controller 804-12, where the transceiver of the controller 804-12 has a communication range 885-12. Also, the user system 855 of the user 850, both of which are located in the workspace 884, has a broadcast range 885-13.

A transceiver of an electrical device 802 can receive a communication signal directly from another electrical device 802 and/or the user system 855 if the receiving electrical device 802 is within the communication range 885 of the user system 855 or the sending electrical device 802. Alternatively, a transceiver of an electrical device 802 can receive a communication signal directly from another electrical device 802 and/or the user system 855 if the communication range 885 of the receiving electrical device 802 overlaps with the communication range 885 of the user system 855 or the sending electrical device 802.

In this example, communication range 885-1 intersects communication range 885-2, which intersects communication range 885-3, which intersects communication range 885-4, which intersects communication range 885-5, which intersects range 885-6, which intersects range 885-7, which intersects communication range 885-8, which intersects communication range 885-9, which intersects communication range 885-10, which intersects communication range 885-11, which intersects communication range 885-12. In other words, the controllers 804 of the electrical devices 802 of FIG. 8 are communicably coupled to each other in a daisy-chain configuration.

In some cases, the communication range 885 of the transceiver of one electrical device 802 can intersect with more than two communication ranges 885 of the transceivers of one or more other electrical devices 802. For example, the communication range 885-13 of the user system 855 overlaps with communication range 885-1, communication range 885-2, communication range 885-3, communication range 885-4, communication range 885-5, communication range 885-6, communication range 885-7, communication range 885-8, communication range 885-9, communication range 885-10, communication range 885-11, and communication range 885-12.

Further, the transceiver of electrical device 802-5 and the transceiver of electrical device 802-7 are within the communication range 885-6 of electrical device 802-6. Also, the transceiver of electrical device 802-1, the transceiver of electrical device 802-2, the transceiver of electrical device 802-3, the transceiver of electrical device 802-4, the transceiver of electrical device 802-5, the transceiver of electrical device 802-6, the transceiver of electrical device 802-7, the transceiver of electrical device 802-8, the transceiver of electrical device 802-9, the transceiver of electrical device 802-10, the transceiver of electrical device 802-11, and the transceiver of electrical device 802-12 are within the communication range 885-13 of the user system 855. This means that any communication signal broadcast by the user system 855 can be directly received by the controller 804 of each of the electrical devices 802 in the system 800.

In some cases, the communication range 885-13 of the user system 855 is not large enough to encompass all of the electrical devices 802 or at least overlap with the communication range 885 of all of the electrical devices 802. An example of this is shown in the system 900 of FIG. 9, which is identical to the system 800 of FIG. 8, except that the communication range 985 of the user system 855 is significantly smaller than the communication range 885-13 in FIG. 8. In the system 900 of FIG. 9, the communication range 985 of the user system overlaps with communication range 885-2, communication range 885-5, communication range 885-6, communication range 885-7, and communication range 885-8. In addition, the transceiver of electrical device 802-6 and the transceiver of electrical device 802-7 are within the communication range 985 of the user system 855.

For communication protocols that allow for communication to occur with the overlap of communication ranges, indirect communication between the user system 855 and electrical device 802-1, electrical device 802—electrical device 802-4, electrical device 802-9, electrical device 802-10, electrical device 802-11, and electrical device 802-12 can be relayed through one or more intermediate electrical devices 802 (e.g., electrical device 802-2). The communication ranges 885 of an electrical device 802 and/or the communication range 985 of the user system 855 can be expanded or reduced to increase or decrease the number of other electrical devices 802 that are in direct communication with a communication signal (e.g., communication signal 195) broadcast by the user system 855. The size of a communication range 885, 985 of one component in the system 900 can be the same as, or different than, the size of the communication range 885, 985 of one or more other components in the system 900.

Figure 10:
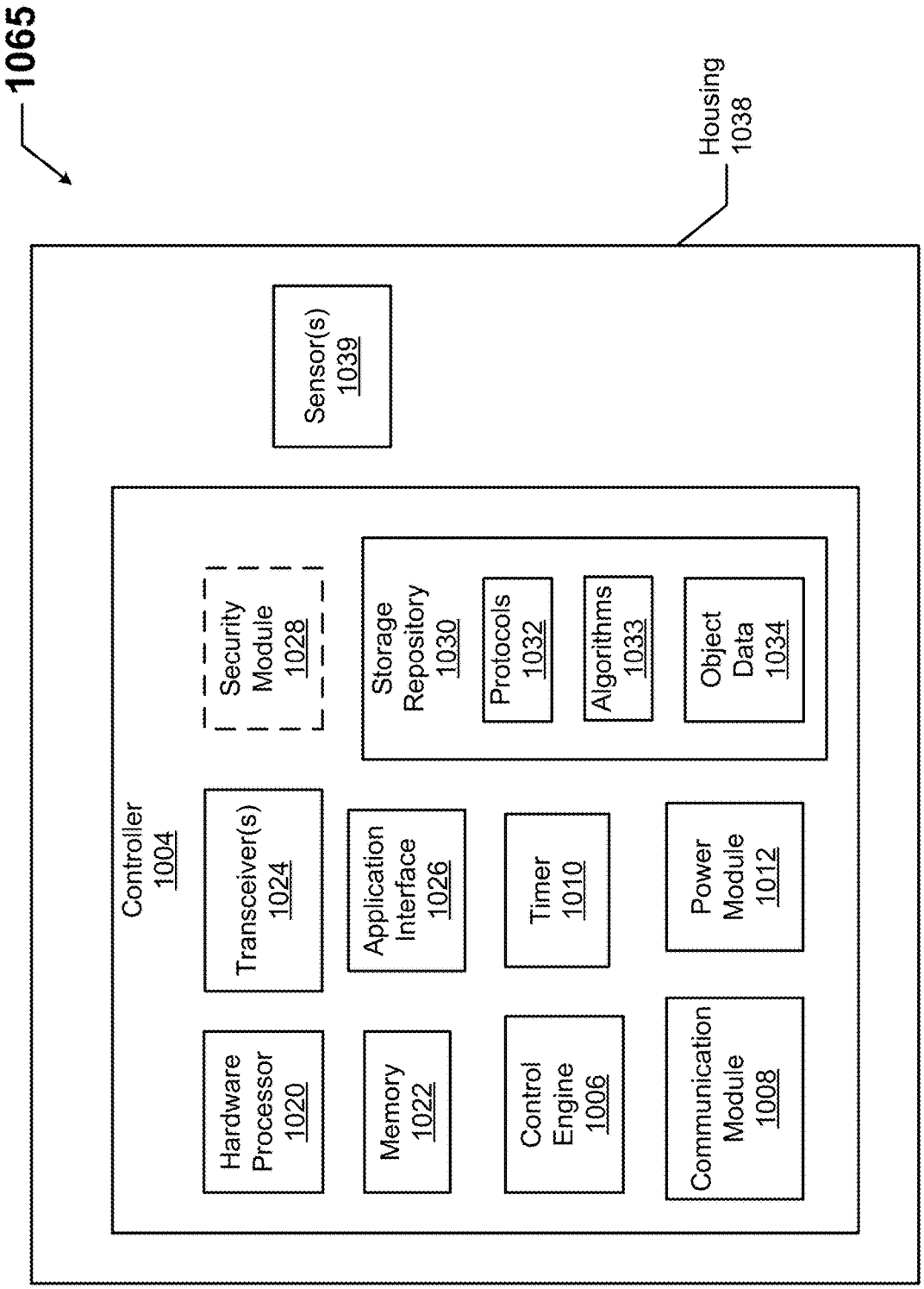
FIG. 10 shows a diagram of an integrated sensor module in accordance with certain example embodiments.

FIG. 10 shows a diagram of an integrated sensor module 1065 in accordance with certain example embodiments. Referring to FIGS. 1 through 10, the integrated sensor module 1065 of FIG. 10 can include one or more of a number of components. Such components, can include, but are not limited to, a controller 1004 (which can include, for example, a control engine 1006, a communication module 1008, a timer 1010, a power module 1012, a storage repository 1030, a hardware processor 1020, a memory 1022, one or more transceivers 1024, an application interface 1026, and, optionally, a security module 1028) and one or more sensors 1039. The components shown in FIG. 10 are not exhaustive, and in some embodiments, one or more of the components shown in FIG. 10 may not be included in an example integrated sensor device 1065. Any component of the example integrated sensor device 1065 can be discrete, combined with one or more other components of the integrated sensor device 1065, and/or shared with the controller 104 of the electrical device 102-1 associated with the integrated sensor device 1065.

The controller 1004, the control engine 1006, the communication module 1008, the timer 1010, the power module 1012, the storage repository 1030 (which can include protocols 1031, algorithms 1032, and object data 1034), the hardware processor 1020, the memory 1022, the one or more transceivers 1024, the application interface 1026, and the security module 1028 can be substantially the same as the corresponding components of the controller 104 discussed above with respect to FIG. 1. In the case of the power module 1012 of the integrated sensor device 1065, the power module 1012 can be substantially the same as, at least in part, the power module 112 and/or the power supply 140 of the electrical device 102-1. Each of the one or more sensors 1039 of the integrated sensor device 1065 are the components that actually measure one or more parameters. An example of a sensor 1039 is a PIR sensor. Each component of the integrated sensor device 1065 can be disposed within, on, or external from a housing 1038 of the integrated sensor device 1065.

Figure 11:
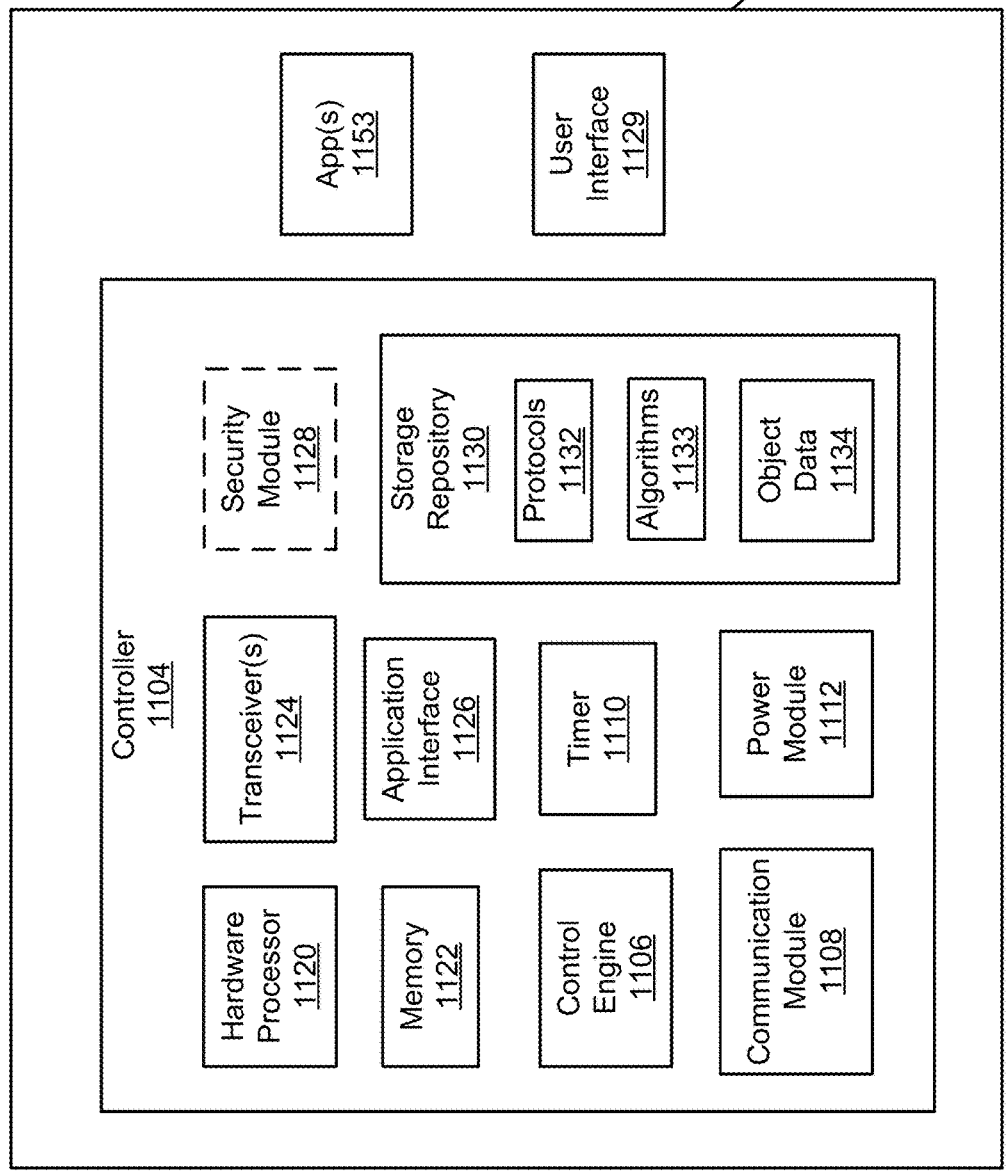
FIG. 11 shows a diagram of a user system in accordance with certain example embodiments.

FIG. 11 shows a diagram of a user system 1155 in accordance with certain example embodiments. Referring to FIGS. 1 through 11, the user system 1155 of FIG. 11 can include one or more of a number of components. Such components, can include, but are not limited to, a controller 1104 (which can include, for example, a control engine 1106, a communication module 1108, a timer 1110, a power module 1112, a storage repository 1130, a hardware processor 1120, a memory 1122, one or more transceivers 1124, an application interface 1126, and, optionally, a security module 1128), a user interface 1129, and one or more apps 1153. The components shown in FIG. 11 are not exhaustive, and in some embodiments, one or more of the components shown in FIG. 11 may not be included in an example user system 1155. Any component of the example user system 1155 can be discrete, combined with one or more other components of the user system 1155, and/or shared with the controller 114 of the electrical device 112-1 associated with the user system 1155.

The controller 1104, the control engine 1106, the communication module 1108, the timer 1110, the power module 1112, the storage repository 1130 (which can include protocols 1131, algorithms 1132, and object data 1134), the hardware processor 1120, the memory 1122, the one or more transceivers 1124, the application interface 1126, and the security module 1128 can be substantially the same as the corresponding components of the controller 114 discussed above with respect to FIG. 1. In the case of the power module 1112 of the user system 1155, the power module 1112 can be substantially the same as, at least in part, the power module 112 and/or the power supply 140 of the electrical device 112-1. Each component of the user system 1155 can be disposed within, on, or external from a housing 1038 of the user system 1155.

One of the apps 1153 of the user system 1155, as discussed above with respect to FIG. 1, can be used to implement various aspects of the invention, including but not limited to creating and broadcasting blocks for a file. In alternative embodiments, rather than an app 1153, the user system 1155 can have some customer hardware, software, and/or firmware that is configured to allow the user system 1155 to perform the same functions as the app 1153. As discussed above with respect to FIG. 1, the user interface 1129 can include, but are not limited to, a graphical user interface, a touchscreen, an application programming interface, a keyboard, a monitor, a mouse, a web service, a data protocol adapter, some other hardware and/or software, or any suitable combination thereof.

Figure 12:
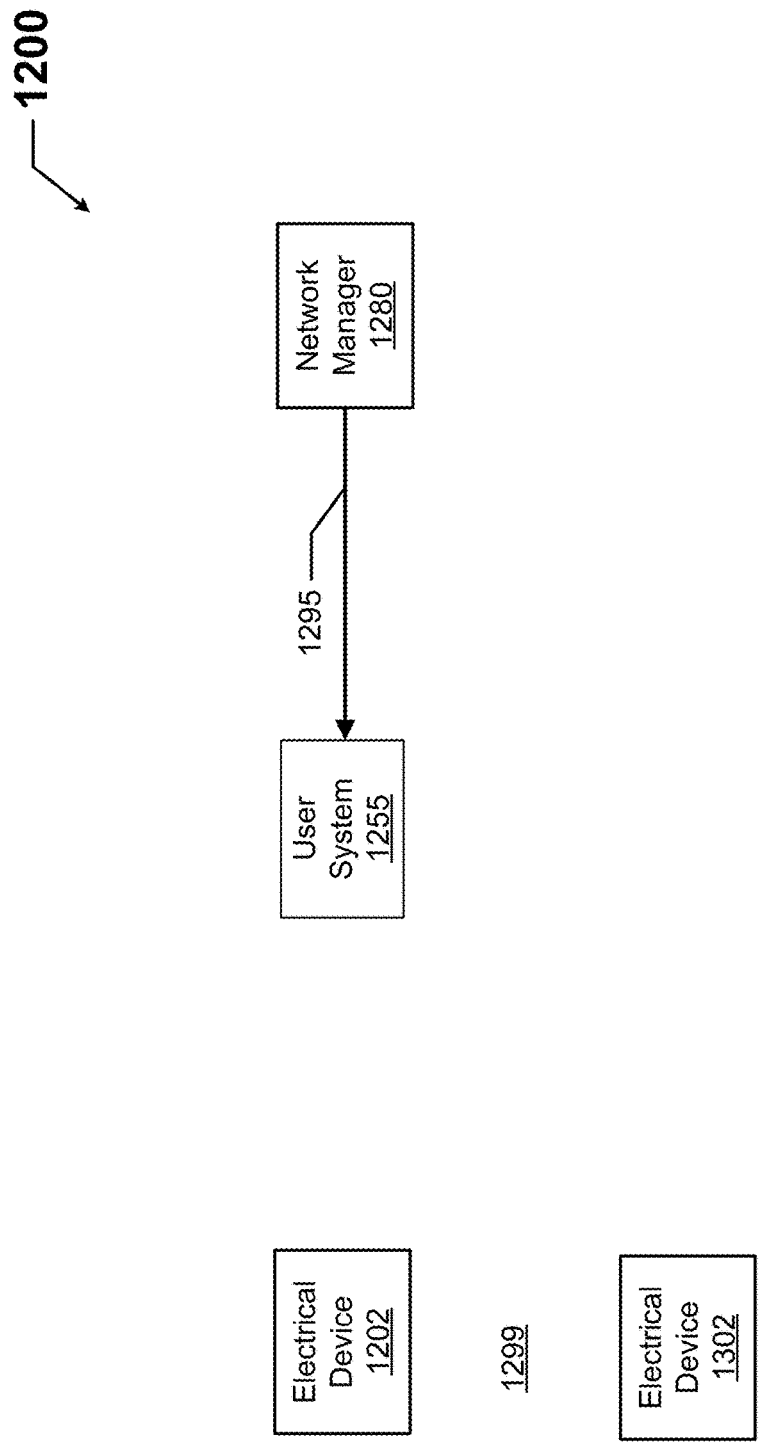
FIGS. 12 through 17 show an example in accordance with certain example embodiments.
Figure 13:
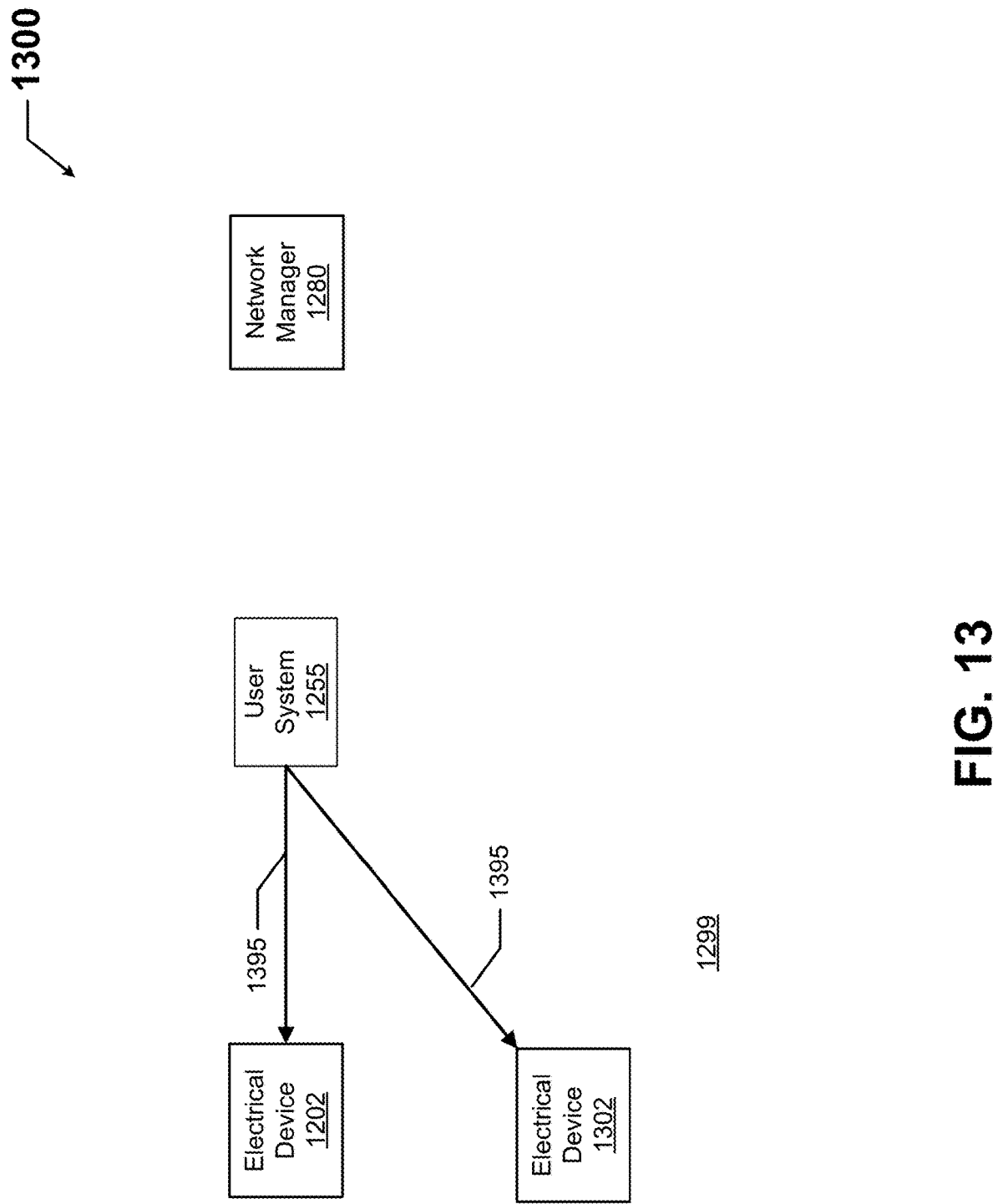
Figure 14:
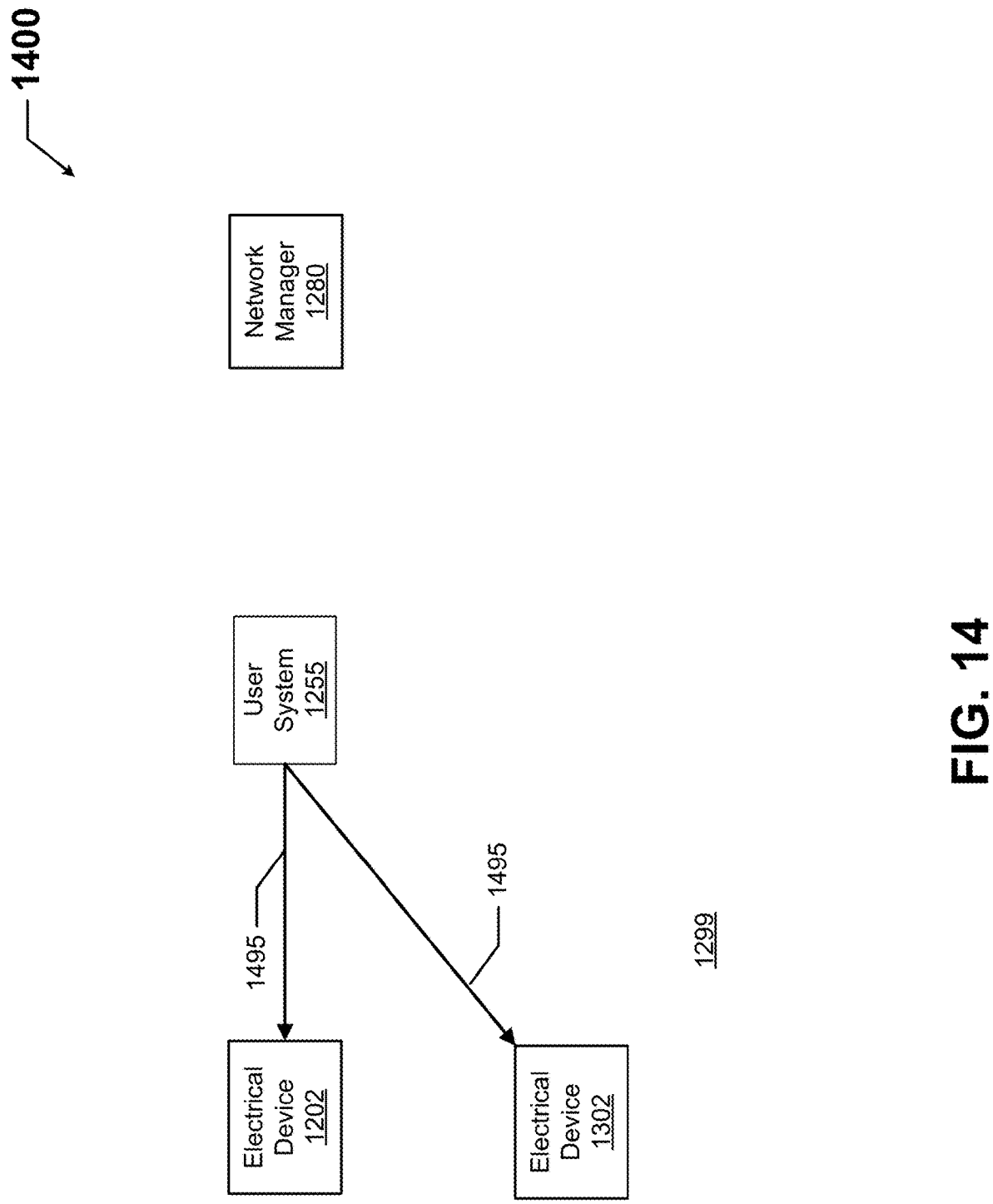
Figure 15:
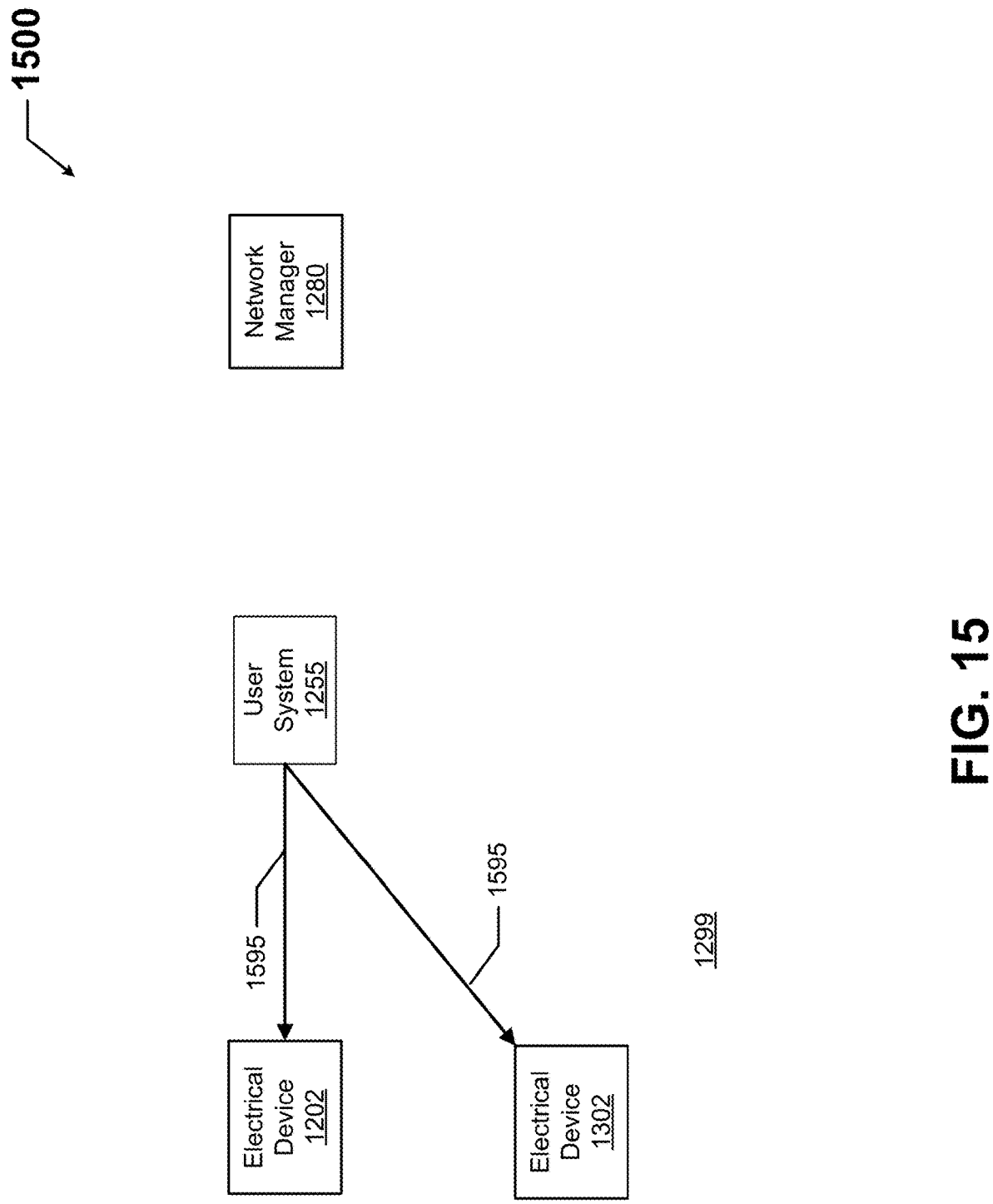
Figure 16:
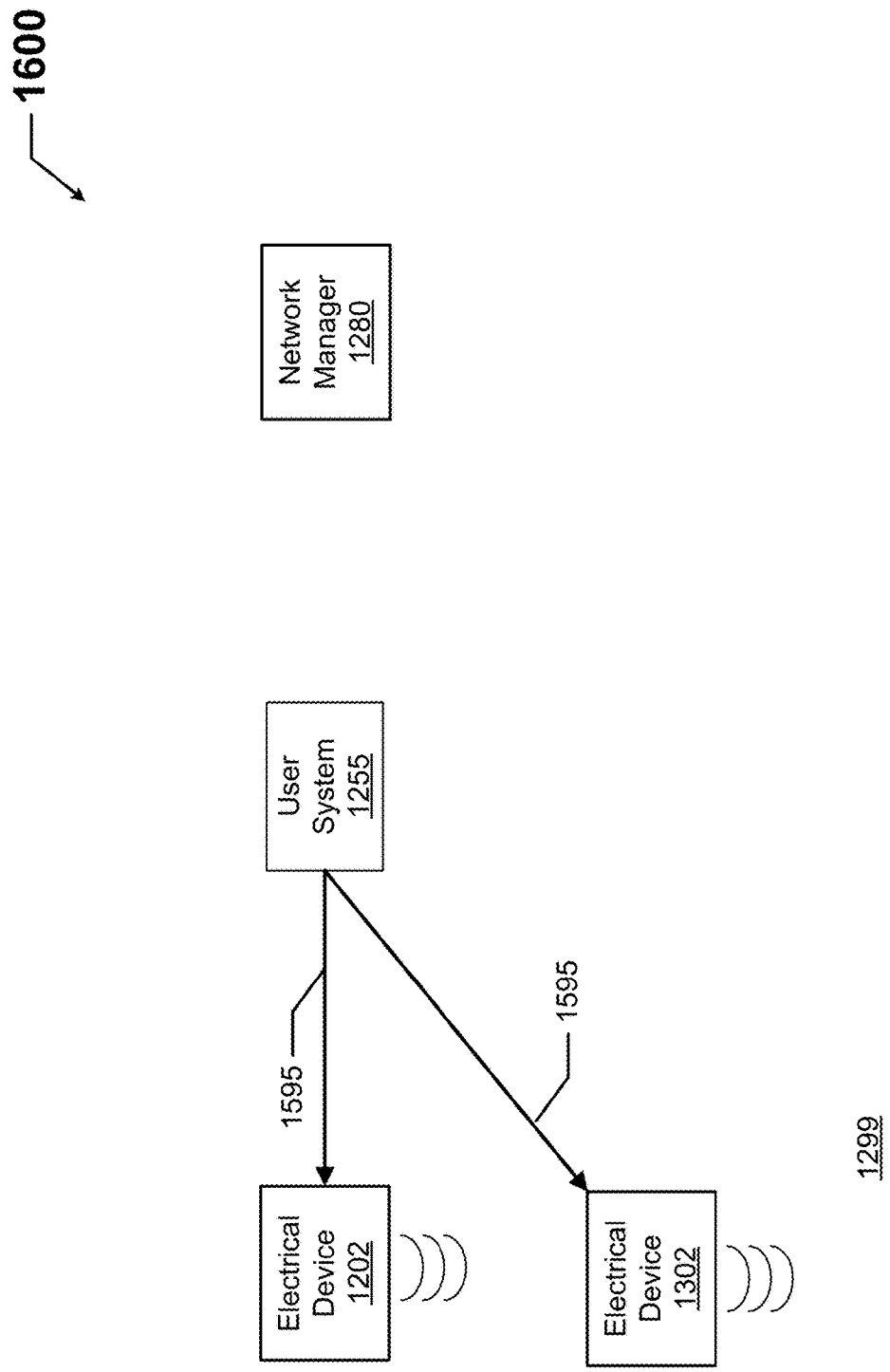
Figure 17:
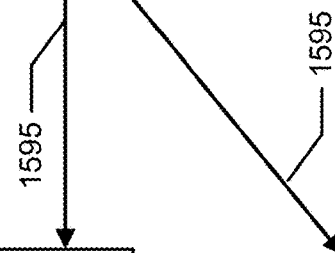

FIGS. 12 through 17 show an example in accordance with certain example embodiments. Specifically, FIG. 12 shows a system 1200 in accordance with certain example embodiments at a first point in time. FIG. 13 shows a system 1300 that includes the same components as the system 1200 of FIG. 12 at a second point in time. FIG. 14 shows a system 1400 that includes the same components as the system 1200 of FIG. 12 at a third point in time. FIG. 15 shows a system 1500 that includes the same components as the system 1200 of FIG. 12 at a fourth point in time. FIG. 16 shows a system 1600 that includes the same components as the system 1200 of FIG. 12 at a fifth point in time. FIG. 17 shows a system 1700 that includes the same components as the system 1200 of FIG. 12 at a sixth point in time.

Referring to FIGS. 1 through 17, the system 1200 of FIG. 12 includes a user system 1255, an electrical device 1202, an electrical device 1302, and a network manager 1280. The user system 1255, electrical device 1202, and electrical device 1302 are located in a volume of space 1299. The network manager 1280 may or may not be located in the volume of space 1299. The network manager 1280, electrical device 1202, electrical device 1302, the user system 1255, and the communication signals (e.g., communication signal 1295, communication signals 1395) of FIGS. 12 through 17 can be substantially the same as the network manager, electrical devices, the user systems, and the communication signals discussed above with respect to FIGS. 1 through 11.

The example captured in FIGS. 12 through 17 does not include a WAC (e.g., WAC 185). In one or more alternative embodiments, a WAC can replace the network manager 1280. In yet one or more alternative embodiments, a WAC can be disposed between and communicably coupled to the network manager 1280 one one side and the user system 1255 on another side. In such a case, the WAC can initiate the communication signal 1295 discussed below. Alternatively, the WAC can be a go-between or pass-through for the network manager 1280 one one side and the user system 1255 on the other side.

In the system 1200 of FIG. 12, the network manager 1280 sends a communication signal 1295 to the user system 1255. The communication signal 1295 can be one or multiple signals that include one or more master files. A master file is an update and/or a new operating instruction for electrical device 1202 and/or electrical device 1302. The communication signal 1295 can be sent using a communication protocol (e.g., Zigbee) and using wired and/or wireless communication links (e.g., communication links 105). The following is an example of a communication signal 1295 that includes two files, File 1 and File 2, where File 2 is approximately 50% the size of File 1.

Upon receiving the communication signal 1295, the user system 1255 (with the assistance of an app (e.g., app 1153)) can reorganize the new/updated instructions within the master file into one or more blocks. The user system 1255 can also generate a summary file that includes information such as, but not limited to, the number of blocks, an identification of the electrical device 1202, an identification of the electrical device 1302.

For example, the user system 1255 can initially assign a module ID to each file. In this case, the user system 1255 assigns module 10 to File 1 and module 20 to File 2. Further, the user system 1255 can break each file down into multiple blocks if the size of the file is too large for a single transmission of a communication signal using a communication protocol (e.g., BLE) between the user system 1255 and the electrical devices (in this case, electrical device 1202 and electrical device 1302) in the system 1200 Each module is of a sufficient size (e.g., 1k bits) to be transmitted in a single communication signal (e.g., communication signal 1395 below). In this example, based on the evaluation performed by the user system 1255, the user system 1255 breaks module 10 into 16 blocks and module 20 into 8 blocks. This reconfiguration of File 1 and File 2 into module 10 and module 20 is shown by the following:

| Module 10 | B1 | B2 | B3 | B4 | B5 | B6 | B7 | B8 | B9 | B10 | B11 | B12 | B13 | B14 | B15 | B16 |
|---|---|---|---|---|---|---|---|---|---|---|---|---|---|---|---|---|

| Module 20 | B1 | B2 | B3 | B4 | B5 | B6 | B7 | B8 |
|---|---|---|---|---|---|---|---|---|

Once the two master files (file 1 and file 2) have been reorganized, the user system 1255 can also create one or more summary files. A summary file includes the ID of the user system 1255 and the number of blocks for each module (in this case, 16 total blocks for Module 10 and 8 total blocks for Module 20). The user system 1255 can also generate an authentication file, which is a file that identifies the ID of each authorized server (e.g., the user system 1255) that can transfer the various blocks of each of the modules to the electrical devices. In this way, once an electrical device (e.g., electrical device 1202) receives the authentication file, then the electrical device knows that all subsequent communication signals received from the server (in this case, the user system 1255) should not be ignored.

An authentication file can take one or more of a number of other forms. For example, the user system 1255 can assign multiple electrical devices (e.g., electrical device 1202 and electrical device 1302) to a single group. Essentially, those electrical devices in the group are being assigned a group ID. In this way, when subsequent communication signals are broadcast by the user system 1255, any communication signal that includes the group ID and that is received by electrical device 1202 and/or electrical device 1302 is processed by electrical device 1202 and/or electrical device 1302 when the communication signal (e.g., communication signal 1395) is received. Conversely, if electrical device 1202 and/or electrical device 1302 receive a communication signal that does not include the group ID, then electrical device 1202 and/or electrical device 1302 ignores the communication signal.

Alternatively, rather than using a group ID, the user system 1255 can generate communication signals that include the unique ID of each individual electrical device. In other words, the user system 1255 has the capability to make some or all of the communication signals that it broadcasts addressable in any of a number of ways. These addressability methods can be altered among communication signals within a series of broadcasts, or they can be consistent throughout the series of broadcasts.

Turning to the system 1300 of FIG. 13, after the user system 1255 has completely processed and reorganized the files received from the network manager 1280 through the one or more communication signals 1295 in FIG. 12, the user system 1255 begins broadcasting multiple communication signals 1395 to electrical device 1202 and electrical device 1302 using a communication protocol (e.g., BLE) that differs from the communication protocol (e.g., Zigbee) used to transmit the communication signal 1295 from the network manager 1280 to the user system 1255.

In the system 1300 of FIG. 13, as long as electrical device 1202 and electrical device 1302 are within the communication range of (or have a communication range that overlaps with) the communication range of the user system 1255, electrical device 1202 and electrical device 1302 receive the one or more communication signals 1395. While this situation can change over time (e.g., the user system 1255 can be a mobile device held by a user 1250 (e.g., a person), who can move with the user system 1255 within or away from the volume of space 1299 while the user system 1255 is broadcasting communication signals 1395), in this example, we assume that the user system 1255 is stationary throughout the process.

The one or more communication signals 1395 broadcast by the user system 1255 in FIG. 13 are the authentication signals discussed above. In this way, when electrical device 1202 and electrical device 1302 receive the communication signals 1395, those electrical devices know that they cannot ignore subsequent communication signals they receive from the user system 1255. This authentication signal can include some limitation (e.g., an amount of time, an amount of communication signals received) that, once exceeded, removes the authentication and/or the duty to process communication signals.

Subsequently, in the system 1400 of FIG. 14, the user system 1255 broadcasts multiple communication signals 1495 that includes one or more summary files, listing the number of blocks for each module. The summary files can also include an identification (e.g., a group number, the ID of the user system 1255, the ID of electrical device 1202, the ID of electrical device 1302) that satisfies the information in the authentication file broadcast in the system 1300 of FIG. 13. When each electrical device receives the one or more communication signals 1495, the electrical device generates a table for each module, where each table has a space for each block of that particular module.

Subsequently, in the system 1500 of FIG. 15, the user system 1255 broadcasts multiple communication signals 1595, where each communication signal 1595 includes a block of a module. Each of these communication signals 1595 can also include an identification (either the same identification as what was provided in communication signal 1495 or a different identification) that satisfies the information in the authentication file broadcast in the system 1300 of FIG. 13.

The communication signals 1595 broadcast by the user system 1255 serve as a type of data carousel. In other words, the user system 1255 sends multiple communication signals in a sequence until all blocks of all modules are broadcast, and then the process is repeated one or more times. This carousel can stop after a certain number of cycles, after a certain period of time has elapsed, until confirmation is made that all intended recipient electrical devices have received all of the blocks for all of the modules, and/or based on some other factor.

In some cases, the user system 1255 can include a hash in each communication signal 1595 to allow the controller of each recipient electrical device to recognize whether the block within the communication signal 1595 is already in the table maintained by that controller. Similarly, the user system 1255 can include a signature (e.g., the ID of the user system 1255) in each communication signal 1595 to allow the controller of each recipient electrical device to confirm that the information contained within the communication signal 1595 is authorized.

The order of the sequence of the blocks sent in the communication signals 1595 of FIG. 15 can vary. For example, the sequence can start with block 16 of module 10, decrement by each block (e.g., block 15, then block 14, then block 13, and so on) until block 1 of module 10, then proceed to block 1 of module 20, and then increment by each block (e.g., block 2, then block 3, then block 4, and so on) until block 8 of module 20 is sent, and then the sequence can be repeated at least one more time.

As another example, the sequence can start by choosing one of the 24 blocks at random, and as each block is chosen, it is removed from the list of eligible blocks for the sequence. When the next sequence begins, the 24 random selections for that sequence starts anew. As yet another example, odd numbered blocks are incrementally sent from module 10 followed by module 20, and then even numbered blocks are incrementally sent from module 10 followed by module 20.

Electrical device 1202 and electrical device 1302 in the system 1500 have no or very limited capability to transmit communication signals using the communication protocol in which the communication signals 1595 are received from the user system 1255. As a result, due to one or more of a number of factors (e.g., interference, low bandwidth availability during the transmission of one or more communication signals 1595), sending all of the blocks in a single sequence of communication signals 1595 may not ensure that electrical device 1202 and electrical device 1302 have safely received all blocks for both modules. In this way, the user system 1255 (including the app) can repeat the sequence (or a different sequence of 24 communication signals 1595) multiple times.

As electrical device 1202 and electrical device 1302 receive each communication signal 1595 from the user system 1255, the controller (e.g., controller 104) of that electrical device identifies the block and module within that communication signal 1595. If the table maintained by the controller of that electrical device does not yet include the block/module information, then that information is inserted into the table. If the table already has the block/module information, then the controller takes no further action with respect to that communication signal 1595.

Eventually, as the communication signals 1595 with the various file and block information continues to be broadcast by the user system 1255 and received by electrical device 1202 and electrical device 1302, and as the controller of electrical device 1202 and the controller of electrical device 1302 populate their respective tables, each of those controllers eventually determine that all fields in their respective tables are fully populated. When this occurs, the entirety of File 1 and File 2 are received by electrical device 1202 and electrical device 1302. When this occurs, as shown by the system 1600 of FIG. 16, the controller of electrical device 1202 and the controller of electrical device 1302 can perform some function to indicate to the user system 1255 (or an associated user) that the entirety of File 1 and File 2 are received by electrical device 1202 and electrical device 1302.

The instruction to perform this function upon receipt of the entirety of File 1 and File 2 can be included in communication signal 1395, communication signal 1495, and/or communication signal 1595. This optional aspect of the invention can be implemented because electrical device 1202 and electrical device 1302 have no or very limited capability to transmit communication signals using the communication protocol in which the communication signals 1595 are received from the user system 1255. The function performed by electrical device 1202 and electrical device 1302 can be one or more of any of a number of functions.

Such a function can be related to the intended use of electrical device 1202 and electrical device 1302. For example, if electrical device 1202 is or includes a light fixture, the function can be to create a strobe effect using its light sources for 10 seconds. As another example, if electrical device 1302 is or includes a voice-activated assistant, then the function can be to emit a particular sound or series of sounds (e.g., a song, a phrase, a drumroll) through its speaker.

In some cases, the user system 1255 is not aware of when, or even if, the intended recipient electrical devices (e.g., electrical device 1202 and electrical device 1302) have received all of the blocks for all modules, thereby completing the transfer of the entirety of all files (File 1 and File 2 in this case). This can be true even if electrical device 1202 and/or electrical device 1302 perform a function, as shown in FIG. 16. As a result, as shown in the system 1700 of FIG. 17, the user system 1255 can continue to broadcast communication signals 1595 until some condition (e.g., lapse of time, completion of a certain number of sequences) is met.

In some cases, an electrical device (e.g., electrical device 1202) can determine whether an attempt to download a file using modules/blocks as content of multiple communication signals 1595 is successful. For example, if a controller of an electrical device determines that a table has not been filled within a certain period of time of establishing the table, then the controller of the electrical device can cancel the table and its contents. In this way, if user system 1255 continues to send communication signals 1595 that includes module/block information, then the controller of the electrical device ignores those communication signals 1595.

In certain example embodiments, there can be multiple user systems in a common volume of space that are simultaneously pushing communication signals that include module/block information. In such a case, the user systems can be synchronized with each other (e.g., by the network manager, by one of the user systems designated as a master). To the extent that one or more electrical devices are within the communication range of multiple user systems that are simultaneously pushing communication signals, this synchronization of the user systems can help ensure that those electrical devices are receiving each of the communication signals.

In one or more example embodiments, alternative identifications are provided to push new instructions and/or upgrades to existing instructions to electrical devices that have little or no capability to send communication signals but that can receive communication signals. Security measures can be added to the process implemented using example embodiments to ensure that intended recipient electrical devices are receiving the new/updated instructions. An electrical device can generate one or more tables based on receiving a communication signal from a user system, where the communication signal includes a number of blocks (and in some cases the size of each block) for each module. A user system can receive one or more files (as from a network manager) and convert each file into a module with one or more blocks. Communication signals broadcast by the user system to electrical devices can be repeated one or more times in some fashion.

Example embodiments can be used with systems used for real-time location (RTLS) of objects. In such a case, example embodiments can be used to more efficiently update instructions used to operate the electrical devices (e.g., integrated sensor devices) in such systems. Example embodiments can be used with multiple communication protocols and/or methods. Example embodiments can be used in new systems or retrofit into existing systems. Example embodiments include new or updated software so that a network can work more efficiently. Using example embodiments described herein can improve communication, safety, maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for providing data to electrical devices in an interconnected network, the system comprising:
a user system disposed in a volume of space, wherein the user system has a communication range, wherein the user system broadcasts, using a first communication protocol, a plurality of communication signals into the volume of space;
a first electrical device disposed in the volume of space and within the communication range of the user system, wherein the first electrical device comprises a first receiver and a first controller coupled to the first receiver, wherein the first receiver receives the plurality of communication signals broadcast by the user system, wherein the first controller:
retrieves first information from a first communication signal, received by the first receiver, of the plurality of communication signals, wherein the first information comprises a first file identification for a first file and a first number of blocks in the first file;
generates a first table for the first number of blocks in the first file;
retrieves second information from a second communication signal, received by the first receiver, of the plurality of communication signals, wherein the second information comprises a first block of the first file; and
stores the first block of the first file in the first table; and
a second electrical device disposed in the volume of space and within the communication range of the user system, wherein the second electrical device comprises a second receiver and a second controller coupled to the second receiver, wherein the second receiver receives the plurality of communication signals broadcast by the user system, wherein the second controller:

retrieves the first information from the first communication signal, received by the first receiver, of the plurality of communication signals;

determines, based on the first information, that the second electrical device is not an intended recipient of the plurality of communication signals; and ignores a remainder of the plurality of communication signals.

2. The system of claim 1, wherein the first controller further:

retrieves the second information from a third communication signal, received by the first receiver, of the plurality of communication signals, wherein the second information comprises the first block of the first file; and discards the second information from the third communication.

3. The system of claim 1, wherein the first controller further:

retrieves third information from a third communication signal, received by the first receiver, of the plurality of communication signals, wherein the third information comprises a second block of the first file, wherein the first table is complete after the second block is added to the first table; and implements the first file.

4. The system of claim 3, wherein the first controller further:

performs an action to indicate that all blocks of the first file are received.

5. The system of claim 3, wherein the second block is placed before the first block in first table based on the third information.

6. The system of claim 1, wherein the first electrical device is unable to transmit under the first communication protocol.

7. The system of claim 1, wherein the user system receives the first file from a network manager using a second communication protocol.

8. The system of claim 7, wherein the first communication protocol is Bluetooth Low Energy.

9. The system of claim 1, wherein the first electrical device comprises a light fixture.

10. The system of claim 1, wherein the first electrical device comprises an integrated sensor device.

11. The system of claim 1, wherein the plurality of communication signals are radio frequency signals.

12. The system of claim 1, wherein the first information of the first communication signal further comprises an identification of the electrical device.

13. The system of claim 1, wherein the first information of the first communication signal further comprises an identification of the user system.

14. The system of claim 1, wherein the controller further:

retrieves third information from a third communication signal, received by the first receiver, of the plurality of communication signals, wherein the third information comprises a second file identification for a second file and a second number of blocks in the second file;

generates a second table for the second number of blocks in the second file;

retrieves fourth information from a fourth communication signal, received by the first receiver, of the plurality of communication signals, wherein the fourth information comprises a first block of the second file; and stores the first block of the second file in the second table.

* * * * *